(12) United States Patent
Miller et al.

(10) Patent No.: US 9,774,787 B2
(45) Date of Patent: Sep. 26, 2017

(54) MOBILE ZOOM USING MULTIPLE OPTICAL IMAGE STABILIZATION CAMERAS

(71) Applicant: Apple Inc., Cupertino, CA (US)

(72) Inventors: Scott W. Miller, Los Gatos, CA (US); Aurelien R. Hubert, Saratoga, CA (US); Shashank Sharma, San Francisco, CA (US); Simon S. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,716

(22) Filed: Sep. 30, 2015

(65) Prior Publication Data

US 2017/0094181 A1    Mar. 30, 2017

(51) Int. Cl.
*H04N 5/232* (2006.01)
*H04N 5/225* (2006.01)

(52) U.S. Cl.
CPC ....... *H04N 5/23296* (2013.01); *H04N 5/2257* (2013.01); *H04N 5/2258* (2013.01); *H04N 5/23287* (2013.01)

(58) Field of Classification Search
CPC .......... G02B 27/64; G02B 27/646; G03B 2205/0007; G03B 2205/00; G03B 2205/015; G03B 2205/0038; G03B 2205/0053; G03B 2205/0061; G03B 2205/0084; H04N 5/2328; H04N 5/23287;

(Continued)

(56) References Cited

U.S. PATENT DOCUMENTS 8,294,780 B2   10/2012  Chang
8,731,390 B2    5/2014  Goldenberg et al.
(Continued)

FOREIGN PATENT DOCUMENTS

CN   104054020    9/2014
EP    2802937    11/2014
(Continued)

OTHER PUBLICATIONS

International Search Report & Written Opinion from PCT/US2016/048475, dated Nov. 2, 2016, Apple Inc., pp. 1-12.

*Primary Examiner* — Rochelle-Ann J Blackman
(74) *Attorney, Agent, or Firm* — Robert C. Kowert; Meyertons, Hood, Kivlin, Kowert & Goetzel, P.C.

(57) ABSTRACT

A first camera unit includes a first actuator for moving a first optical package configured for a first focal length. In some embodiments, a camera system of a multifunction device includes a second camera unit of the multifunction device for simultaneously capturing a second image of a second visual field. In some embodiments, the second camera unit includes a second actuator for moving a second optical package configured for a second focal length. In some embodiments, the second actuator includes a second actuator lateral magnet. In some embodiments, the first optical package and the second optical package are situated between the first actuator later magnet and the second actuator lateral magnet along an axis between the first actuator lateral magnet and the second actuator lateral magnet. In some embodiments, no actuator lateral magnets are situated between the first optical package and the second optical package along the axis.

20 Claims, 29 Drawing Sheets

(58) Field of Classification Search
CPC . H04N 5/23245; H04N 5/225; H04N 5/23296
USPC .... 396/55, 75, 77, 79–82; 348/208.4, 208.5, 348/208.7, 208.11, 360; 359/554, 557, 359/819–826
See application file for complete search history.

(56) References Cited

U.S. PATENT DOCUMENTS

| | | | |
|---|---|---|---|
| 8,792,782 | B1 | 7/2014 | Cheng et al. |
| 9,083,873 | B1 | 7/2015 | Lewkow |
| 9,185,291 | B1 | 11/2015 | Shabtay et al. |
| 2010/0097443 | A1 | 4/2010 | Lablans |
| 2011/0169920 | A1 | 7/2011 | Ryu et al. |
| 2013/0028581 | A1* | 1/2013 | Yeung .................... G03B 17/14 396/75 |
| 2013/0141541 | A1 | 6/2013 | Jung et al. |
| 2013/0194466 | A1 | 8/2013 | Cheng et al. |
| 2013/0242057 | A1 | 9/2013 | Hong et al. |
| 2015/0029601 | A1 | 1/2015 | Dror et al. |
| 2015/0085174 | A1 | 3/2015 | Shabtay et al. |
| 2015/0177479 | A1* | 6/2015 | Lee .......................... G02B 7/09 359/824 |
| 2015/0244942 | A1 | 8/2015 | Shabtay et al. |
| 2015/0316744 | A1 | 11/2015 | Chen |
| 2016/0316150 | A1 | 10/2016 | Eromaki |

FOREIGN PATENT DOCUMENTS

| | | |
|---|---|---|
| TW | I498658 | 9/2013 |
| TW | 201518838 | 5/2015 |
| TW | 201518854 | 5/2015 |
| WO | 2015001519 | 1/2015 |
| WO | 2015015383 | 2/2015 |
| WO | 2015068056 | 5/2015 |
| WO | 2015068061 | 5/2015 |
| WO | 2015124966 | 8/2015 |

\* cited by examiner

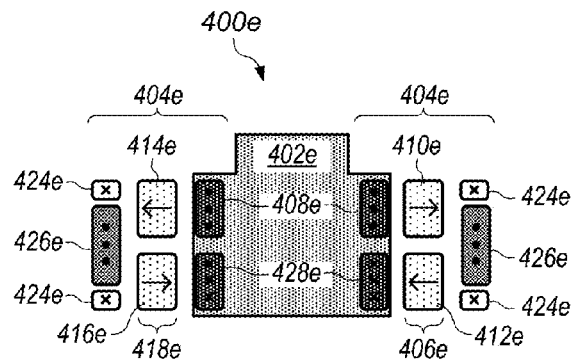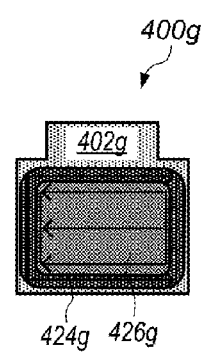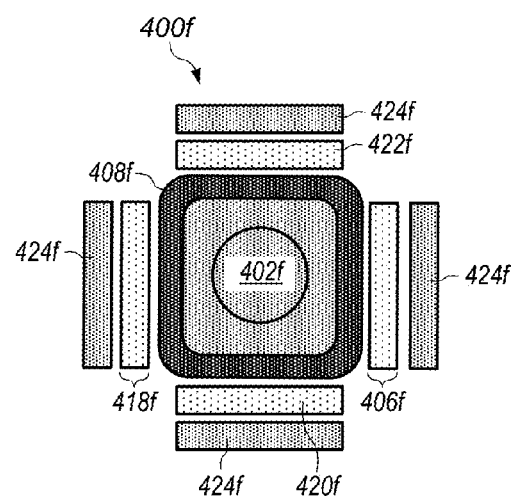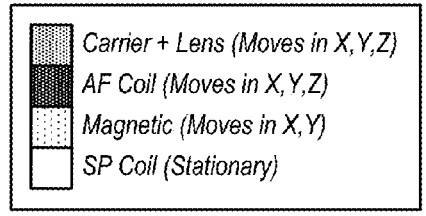
FIG. 4E
FIG. 4G
FIG. 4F
FIG. 4H

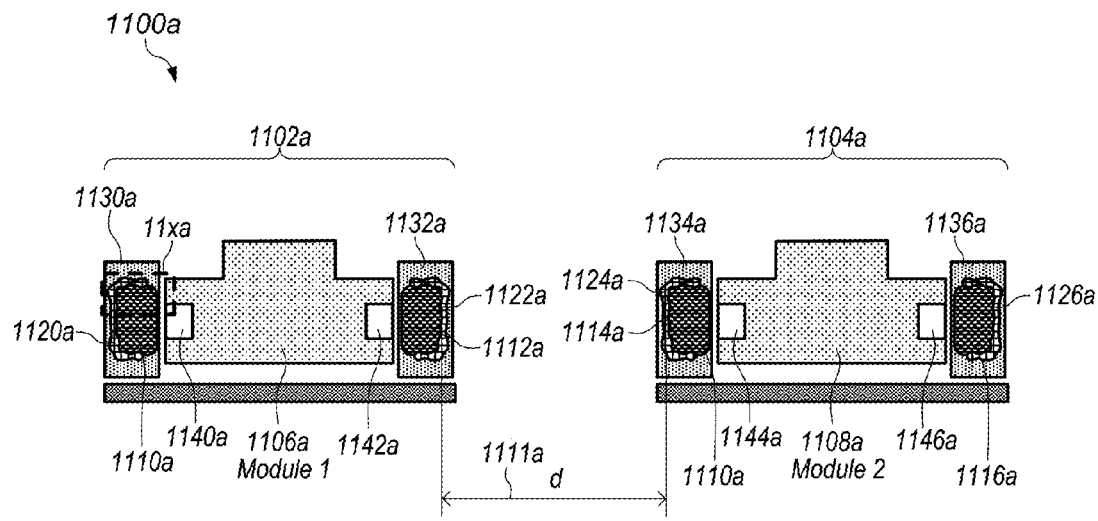
FIG. 11A
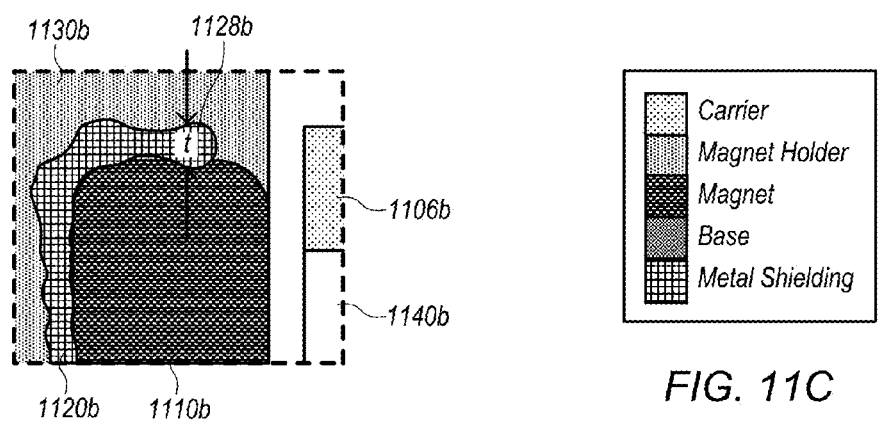
FIG. 11B
FIG. 11C

*Inventive concept 7-1 – no center magnet. First orientation plan*

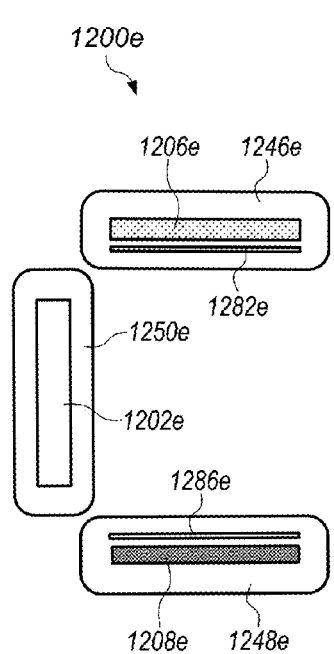
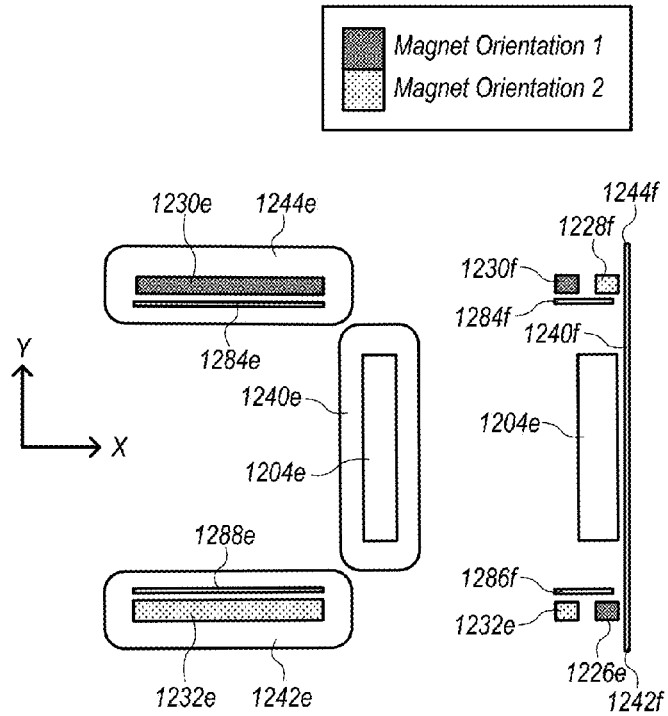
FIG. 12E
FIG. 12F
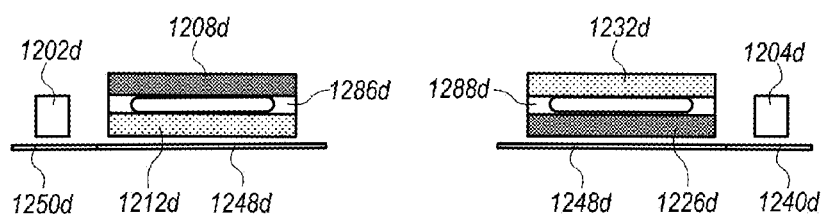
FIG. 12D

*Inventive concept 7-3 – no center magnet, but wait, the polarity configuration has changed from 12 C.*

MOBILE ZOOM USING MULTIPLE OPTICAL IMAGE STABILIZATION CAMERAS

BACKGROUND

Technical Field

This disclosure relates generally to camera module components and more specifically to the use of multiple cameras for zoom functions in mobile devices.

Description of the Related Art

The advent of small, mobile multipurpose devices such as smartphones and tablet or pad devices has resulted in a need for high-resolution, small form factor cameras, capable of generating high levels of image quality, for integration in the devices.

Increasingly, as users rely on these multifunction devices as their primary cameras for day-to-day use, users demand features, such as zoom photography, that they have become accustomed to using in dedicated-purpose camera bodies. The zoom function is useful for capturing the details of a scene or alternatively capturing the context in which those details exist. The ability to change focal length to achieve zoom effects is sufficiently compelling to users of dedicated purpose cameras that it compels them to carry bags with an array of removable lenses, each of which weighs more and takes up more space than many common examples of a multifunction device, such as a phone.

Providing the zoom feature in a camera unit of a multifunction device has traditionally required moving mechanical parts that increase complexity and cost of the device. Such moving parts also reduce reliability of the device and take up valuable space inside the device, which puts the desire for zoom functions in direct conflict with the desire for smaller camera units that take up less space in the multifunction device.

SUMMARY OF EMBODIMENTS

In some embodiments, a camera system of a multifunction device includes a first camera unit of a multifunction device for capturing a first image of a first visual field. In some embodiments, the first camera unit includes a first actuator for moving a first optical package configured for a first focal length. In some embodiments, a camera system of a multifunction device includes a second camera unit of the multifunction device for simultaneously capturing a second image of a second visual field. In some embodiments, the second camera unit includes a second actuator for moving a second optical package configured for a second focal length. In some embodiments, the second actuator includes a second actuator lateral magnet. In some embodiments, the first optical package and the second optical package are situated between the first actuator later magnet and the second actuator lateral magnet along an axis between the first actuator lateral magnet and the second actuator lateral magnet. In some embodiments, no actuator lateral magnets are situated between the first optical package and the second optical package along the axis.

BRIEF DESCRIPTION OF THE DRAWINGS

FIGS. 4 E-H depict an example embodiment of camera module components including paired side magnet arrays usable for a multiple camera system for portable zoom, according to at least some embodiments.

FIGS. 11A-C depict an example embodiment of camera module components including shielded magnets usable for a multiple camera system for portable zoom, according to at least some embodiments.

FIGS. 12A-G depict example embodiments of camera module components including arrays of magnets omitting a center magnet between modules and usable for a multiple camera system for portable zoom, according to at least some embodiments.

Figure 1:
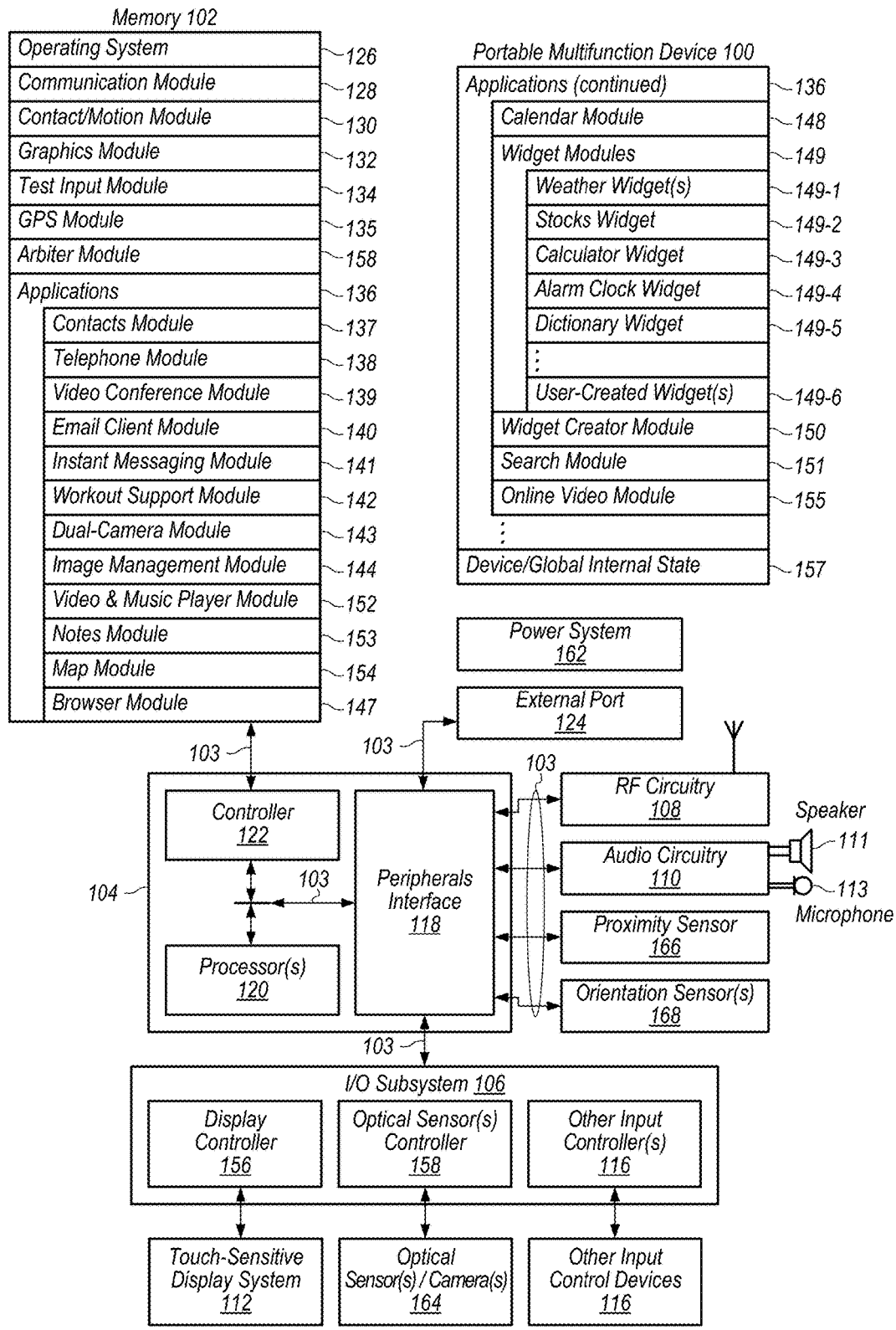
FIG. 1 illustrates a block diagram of a portable multifunction device with a multiple camera system for portable zoom in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Multiple Cameras for Optical Zoom

Some embodiments include methods and/or systems for using multiple cameras to provide optical zoom to a user. Some embodiments include a first camera unit of a multifunction device capturing a first image of a first visual field. A second camera unit of the multifunction device simultaneously captures a second image of a second visual field. In some embodiments, the first camera unit includes a first optical package with a first focal length. In some embodiments, the second camera unit includes a second optical package with a second focal length. In some embodiments, the first focal length is different from the second focal length, and the first visual field is a subset of the second visual field.

In some embodiments, a camera system of a multifunction device, includes a first camera unit of the multifunction device for capturing a first image of a first visual field. In some embodiments, the first camera unit includes a first optical image stabilization actuator for moving a first optical package configured for a first focal length. The camera system further includes second camera unit of the multifunction device for simultaneously capturing a second image of a second visual field. In some embodiments, the second camera unit includes a second optical image stabilization actuator for moving a second optical package configured for a second focal length. In some embodiments, the first focal length is different from the second focal length. In some embodiments, the first focal length being different from the second focal length includes both the first focal length and the second focal length being adjustable ranges, which may or may not overlap.

In some embodiments, the camera system includes a shared magnet positioned between the first camera unit and the second camera unit to generate magnetic fields usable in creating motion in both the first camera actuator and the second camera actuator. In some embodiments, the camera system includes a shared magnet positioned between the first camera unit and the second camera unit to generate magnetic fields usable in creating motion in both the first camera actuator and the second camera actuator.

In some embodiments, the camera system further includes a first actuator lateral magnet positioned opposite the shared magnet with respect to an optical axis of the first camera unit. In some embodiments, the camera system further includes a pair of first actuator transverse magnets situated opposite one another with respect to an axis between the shared magnet and the first actuator lateral magnet. In some embodiments, the camera system further includes a second actuator lateral magnet positioned opposite the shared magnet with respect to an optical axis of the second camera unit. In some embodiments, the camera system further includes a pair of second actuator transverse magnets situated opposite one another with respect to an axis between the shared magnet and the second actuator lateral magnet.

In some embodiments, the camera system includes a shared magnet holder to which are attached one or more magnets of the first camera unit and one or more magnets of the second camera unit used to generate magnetic fields usable in creating motion in one or more of the first camera actuator and the second camera actuator. In some embodiments, the camera system includes one or more stationary magnets secured at fixed positions relative to image sensors of the first camera unit and the second camera unit to generate magnetic fields usable in creating motion in one or more of the first camera actuator and the second camera actuator.

In some embodiments, the second camera unit includes a second central magnet array situated along the axis between the first optics package of the first camera unit and the second optics package of the second camera unit. In some embodiments, the second central magnet array includes an second central upper magnet having a first polarity and a second central lower magnet having a polarity antiparallel to the first polarity. In some embodiments, the second camera unit includes a second distal magnet array situated opposite the second central magnet array with respect to the second optics package of the second camera unit. In some embodiments, the second distal magnet array includes a second distal lower magnet having the first polarity and a second distal upper magnet.

In some embodiments, the first camera unit includes a first central magnet array situated along an axis between a first optics package of the first camera unit and a second optics package of the second camera unit. In some embodiments, the first central magnet array includes a first central upper magnet having a first polarity and a first central lower magnet having a polarity antiparallel to the first polarity. In some embodiments, the first camera unit includes a first distal magnet array situated opposite the first central magnet array with respect to the first optics package of the first camera unit. In some embodiments, the first distal magnet array includes a first distal lower magnet having the first polarity and a first distal upper magnet having the polarity antiparallel to the first polarity.

In some embodiments, a magnetic shield is included between the first optical image stabilization actuator and the second optical image stabilization actuator.

In some embodiments, a metallic shield is included between the first optical image stabilization actuator and the second optical image stabilization actuator. In some embodiments, the metallic shield includes steel including at least a quantity of iron, a quantity of manganese, a quantity of Sulphur, a quantity of phosphorus, and a quantity of carbon. In some embodiments, shielding is articulated to individual magnets of the first optical image stabilization actuator and the second optical image stabilization actuator.

In some embodiments, metallic shields is are articulated to respective ones of the magnets of the first optical image stabilization actuator and respective ones of the magnets of the second optical image stabilization actuator to reduce magnetic interference between the first optical image stabilization actuator and the second optical image stabilization actuator.

In some embodiments, a method for capturing images with multiple cameras of a multifunction device includes providing optical image stabilization to the multiple cameras. In some embodiments, the method includes a first camera unit of a multifunction device capturing a first image of a first visual field. In some embodiments, the method includes a second camera unit of the multifunction device simultaneously capturing a second image of a second visual field. In some embodiments, the first camera unit includes a first optical package with a first focal length. In some embodiments, the second camera unit includes a second optical package with a second focal length. In some embodiments, the first focal length is different from the second focal length, and the first visual field is a subset of the second visual field. In some embodiments, the method includes providing optical image stabilization to the first camera unit, and providing optical image stabilization to the second camera unit.

In some embodiments, the providing optical image stabilization to the first camera unit and the providing optical image stabilization to the second camera unit further include moving the first camera unit and the second camera unit independently of one another.

In some embodiments, the providing optical image stabilization to the first camera unit and the providing optical image stabilization to the second camera unit further include moving the first camera unit and the second camera unit in unison.

In some embodiments, the providing optical image stabilization to the first camera unit and the providing optical image stabilization to the second camera unit further include generating a first magnetic field in the first camera unit and a second magnetic field in the second camera unit based on a magnet shared between the first camera unit and the second camera unit.

In some embodiments, the providing optical image stabilization to the first camera unit and the providing optical image stabilization to the second camera unit further include moving the first camera unit and the second camera unit in unison through operation of a first camera unit actuator and a second camera unit actuator that share a central magnet.

In some embodiments, the providing optical image stabilization to the first camera unit and the providing optical image stabilization to the second camera unit further include moving the first camera unit and the second camera unit in unison through operation of a first camera unit actuator and a second camera unit actuator that share a magnet holder.

Some embodiments include a non-transitory computer-readable storage medium, storing program instructions computer-executable to implement capturing a first image of a first visual field with a first camera unit of a multifunction device, simultaneously capturing a second image of a second visual field with a second camera unit of the multifunction device, providing optical image stabilization to the first camera unit, and providing optical image stabilization to the second camera unit.

In some embodiments, the first camera unit includes a first optical package with a first focal length, the second camera unit includes a second optical package with a second focal length, the first focal length is different from the second focal length, and the first visual field is a subset of the second visual field.

In some embodiments, the program instructions computer-executable to implement providing optical image stabilization to the first camera unit and the providing optical image stabilization to the second camera unit further include program instructions computer-executable to implement moving the first camera unit and the second camera unit independently of one another.

In some embodiments, the program instructions computer-executable to implement providing optical image stabilization to the first camera unit and the providing optical image stabilization to the second camera unit further include program instructions computer-executable to implement moving the first camera unit and the second camera unit in unison.

In some embodiments, the program instructions computer-executable to implement providing optical image stabilization to the first camera unit and the program instructions computer-executable to implement providing optical image stabilization to the second camera unit further include program instructions computer-executable to implement generating a first magnetic field in the first camera unit and a second magnetic field in the second camera unit based on a magnet shared between the first camera unit and the second camera unit.

In some embodiments, the program instructions computer-executable to implement providing optical image stabilization to the first camera unit and the program instructions computer-executable to implement providing optical image stabilization to the second camera unit further include program instructions computer-executable to implement moving the first camera unit and the second camera unit in unison through operation of a first camera unit actuator and a second camera unit actuator that share a magnet holder.

In some embodiments, a camera system of a multifunction device includes a first camera unit of a multifunction device for capturing a first image of a first visual field. In some embodiments, the first camera unit includes a first actuator for moving a first optical package configured for a first focal length. In some embodiments, a camera system of a multifunction device includes a second camera unit of the multifunction device for simultaneously capturing a second image of a second visual field. In some embodiments, the second camera unit includes a second actuator for moving a second optical package configured for a second focal length. In some embodiments, the second actuator includes a second actuator lateral magnet. In some embodiments, the first optical package and the second optical package are situated between the first actuator later magnet and the second actuator lateral magnet along an axis between the first actuator lateral magnet and the second actuator lateral magnet. In some embodiments, no actuator lateral magnets are situated between the first optical package and the second optical package along the axis.

In some embodiments, the first actuator lateral magnet and the second actuator lateral magnet have polarities aligned antiparallel to one another. In some embodiments, the first camera unit and the second camera unit each include a respective first pair of first actuator transverse magnets situated opposite one another with respect to the axis between the first actuator lateral magnet and the second actuator lateral magnet, and the first camera unit and the second camera unit each include a respective second pair of first actuator transverse magnets situated opposite one another with respect to the axis between the first actuator lateral magnet and the second actuator lateral magnet.

In some embodiments, the magnets of the respective first pair of first actuator transverse magnets have polarity alignments parallel to the respective alignments of corresponding respective magnets of the first pair of second actuator transverse magnets.

In some embodiments, the magnets of the respective first pair of first actuator transverse magnets have polarity alignments antiparallel to the respective alignments of corresponding respective magnets of the first pair of second actuator transverse magnets.

In some embodiments, the first actuator lateral magnet and the second actuator lateral magnet have polarities aligned at right angles to polarities of the respective first pair of first actuator transverse magnets.

Some embodiments further include coils aligned with current circulating in a plane parallel to a plane in which the first actuator lateral magnet and the second actuator lateral magnet have polarities aligned.

In some embodiments, a camera unit of a multifunction device, includes an optical package and an actuator for moving the optical package to a first focal length. In some embodiments, the actuator includes a lateral magnet to one side of the optical package, and a first pair of first actuator transverse magnets situated on sides opposite one another with respect to an axis between the optical package and the lateral magnet. In some embodiments, the lateral magnet is situated one on one side of the optical package at which no transverse magnets are present. In some embodiments, no actuator lateral magnet is situated on a remaining side of the optical package at which nether the lateral magnet nor the transverse magnets are situated.

In some embodiments, In some embodiments, coils are aligned with current circulating in a plane parallel to a plane in which the lateral magnet and the transverse magnets have polarities aligned.

In some embodiments, coils are aligned with current circulating in a plane perpendicular to a plane in which the lateral magnet and the transverse magnets have polarities aligned.

In some embodiments, a second pair of first actuator transverse magnets is situated opposite one another with respect to the axis between the lateral magnet and the optical package. In some embodiments, the magnets of the first pair of transverse magnets have polarity alignments antiparallel to one another.

In some embodiments, the magnets of the second pair of transverse magnets have polarity alignments antiparallel to one another. In some embodiments, the magnets of the first pair of transverse magnets have polarity alignments antiparallel to magnets of the second pair of transverse magnets situated on a same side of the axis between the lateral magnet and the optical package.

Some embodiments include an actuator having a lateral magnet for moving an optical package, wherein the lateral magnet is situated to one side of the optical package, and a first pair of first actuator transverse magnets situated on sides opposite one another with respect to an axis between the optical package and the lateral magnet. In some embodiments, the lateral magnet is situated one on one side of the optical package at which no transverse magnets are present, and no actuator lateral magnet is situated on a remaining side of the optical package at which nether the lateral magnet nor the transverse magnets are situated.

In some embodiments, coils are aligned with current circulating in a plane parallel to a plane in which the lateral magnet and the transverse magnets have polarities aligned. In some embodiments, coils are aligned with current circulating in a plane perpendicular to a plane in which the lateral magnet and the transverse magnets have polarities aligned.

In some embodiments, a second pair of first actuator transverse magnets situated opposite one another with respect to the axis between the lateral magnet and the optical package. In some embodiments, the magnets of the first pair of transverse magnets have polarity alignments antiparallel to one another. In some embodiments, the magnets of the second pair of transverse magnets have polarity alignments antiparallel to one another.

In some embodiments, the first image and the second image are preserved to a storage medium as separate data structures. In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time t(0), and the second image is a moving image data structure captured over a time interval including t(0).

Some embodiments assign metadata to the first image and the second image a time indexing feature for establishing that the first image and the second image correspond as having been simultaneously captured or captured at overlapping time intervals. Some embodiments display the first image in a screen interface with a control for switching to display of the second image, and, responsive to an actuation of the control, display the second image in place of the first image. Some embodiments generate a synthetic intermediate image at least in part from data of the first image and data of the second image. In some embodiments, the synthetic intermediate image has a third focal length different from each of the first focal length and the second focal length, and the synthetic intermediate image has a third visual field different from each of the first visual field and the second visual field. Some embodiments preserve storage of the first image and data of the second image after creation of the synthetic intermediate image.

Some embodiments generate a synthetic result image at least in part from data of the first image and data of the second image. In some embodiments, the synthetic intermediate image has is generated by enhancing the first image using data from the second image. Some embodiments display the first image and the second image in a shared screen interface.

Some embodiments include a camera system of a multifunction device. In some embodiments, the camera system includes a first camera unit of a multifunction device for capturing a first image of a first visual field and a second camera unit of the multifunction device for simultaneously capturing a second image of a second visual field. In some embodiments, the first camera unit includes a first optical package configured for a first focal length. In some embodiments, the second camera unit includes a second optical package configured for a second focal length. In some embodiments, the first focal length is different from the second focal length.

In some embodiments, the camera system includes a processing unit configured to assign to the first image and the second image a time indexing feature for establishing that the first image and the second image were simultaneously captured. In some embodiments, the first camera unit includes a lens having a folded lens configuration with a longer focal length than a lens of the second camera unit, and the second visual field is centered on a second visual axis aligned with a first visual axis on which the first visual field is centered.

In some embodiments, the first camera unit includes a lens having a longer focal length than a lens of the second camera unit, and the second visual field is centered on a second visual axis aligned with a first visual axis on which the first visual field is centered. In some embodiments, the first camera unit includes a first moveable lens and a first image sensor attached a chassis of the camera unit, the second camera unit includes a lens and a second image sensor moveably attached a chassis of the camera unit.

In some embodiments, the first camera unit includes a first moveable lens and a first image sensor attached a chassis of the camera unit, and the second camera unit includes a lens and a second image sensor moveably attached a chassis of the camera unit. In some embodiments, the first camera unit and the second camera unit include a first image processing pipeline and a second image processing pipeline, respectively.

Some embodiments include a non-transitory computer-readable storage medium, storing program instructions, computer-executable to implement a first camera unit of a multifunction device capturing a first image of a first visual field, and a second camera unit of the multifunction device simultaneously capturing a second image of a second visual field. In some embodiments, the first camera unit includes a first optical package with a first focal length, the second camera unit includes a second optical package with a second focal length, the first focal length is different from the second focal length, and the first visual field is a subset of the second visual field.

In some embodiments, the program instructions are further computer-executable to implement assigning metadata to the first image and the second image a time indexing feature for establishing that the first image and the second image correspond as having been simultaneously captured. In some embodiments, the program instructions are further computer-executable to implement displaying the first image in a screen interface with a control for switching to display of the second image, and responsive to an actuation of the control, displaying the second image in place of the first image.

In some embodiments, the program instructions are further computer-executable to implement generating a synthetic intermediate image from data of the first image and data of the second image. In some embodiments, the synthetic intermediate image has a third focal length different from each of the first focal length and the second focal length, and the synthetic intermediate image has a third visual field different from each of the first visual field and the second visual field. In some embodiments, the program instructions are further computer-executable to implement preserving storage of the first image and data of the second image after creation of the synthetic intermediate image. In some embodiments, the synthetic intermediate image has is generated by enhancing the first image using data from the second image. In some embodiments, the program instructions are further computer-executable to implement displaying the first image and the second image in a shared screen interface.

In some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time $t(0)$, and the second image is a moving image data structure captured over a time interval including $t(0)$.

Multifunction Device Examples

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1 is a block diagram illustrating portable multifunction device 100 with cameras 164a-b in accordance with some embodiments. Cameras 164a-b are sometimes called "optical sensors" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include optical sensors 164a-b. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in various of the figures may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions calculated by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include optical sensors or cameras 164a-b. Optical sensors 164a-b may include charge-coupled device (CCD) or complementary metal-oxide semiconductor (CMOS) phototransistors. Optical sensors 164a-b receive light from the environment, projected through one or more lens, and converts the light to data representing an image. In conjunction with imaging module 143 (also called a camera module), optical sensors 164a-b may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display. In embodiments in which multiple cameras or optical sensors 164a-b are supported, each of the multiple cameras or optical sensors 164a-b may include its own photo sensor(s), or the multiple cameras or optical sensors 164a-b may be supported by a shared photo sensor. Likewise, in embodiments in which multiple cameras or optical sensors 164a-b are supported, each of the multiple cameras or optical sensors 164a-b may include its own image processing pipeline of processors and storage units, or the multiple cameras or optical sensors 164a-b may be supported by a image processing pipeline of processors and storage units.

Device 100 may also include one or more proximity sensors 166. FIG. 28 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;

e-mail client module 140;
instant messaging (IM) module 141;
workout support module 142;
dual camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player
module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensors 164a-b, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with dual camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, dual camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and dual camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
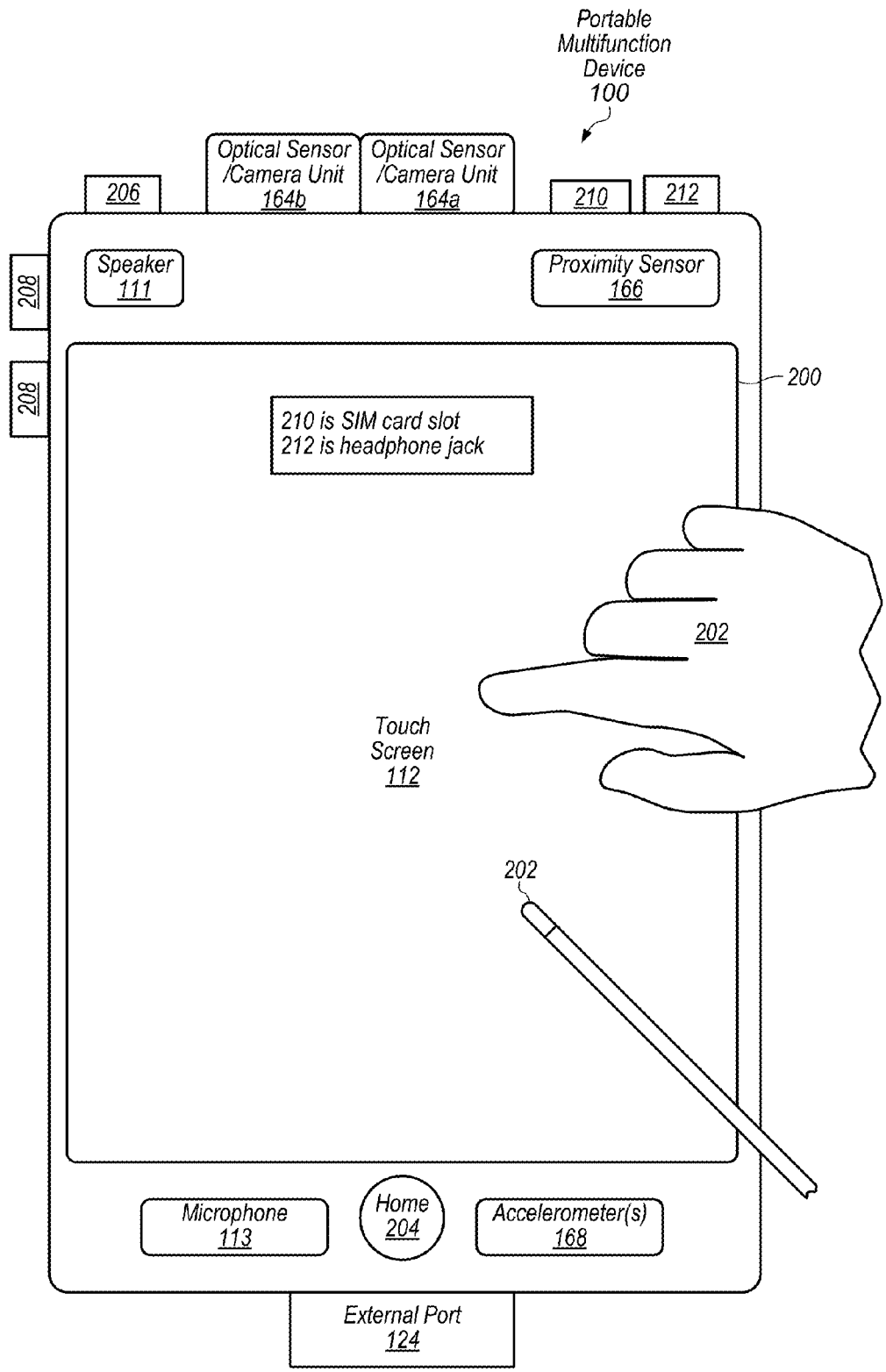
FIG. 2 depicts a portable multifunction device having a multiple camera system for portable zoom in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensors/cameras 164a-b (on the front of a device), a rear-facing camera or optical sensor that is pointed opposite from the display may be used instead of or in addition to an optical sensors/cameras 164a-b on the front of a device.

Figure 3A:
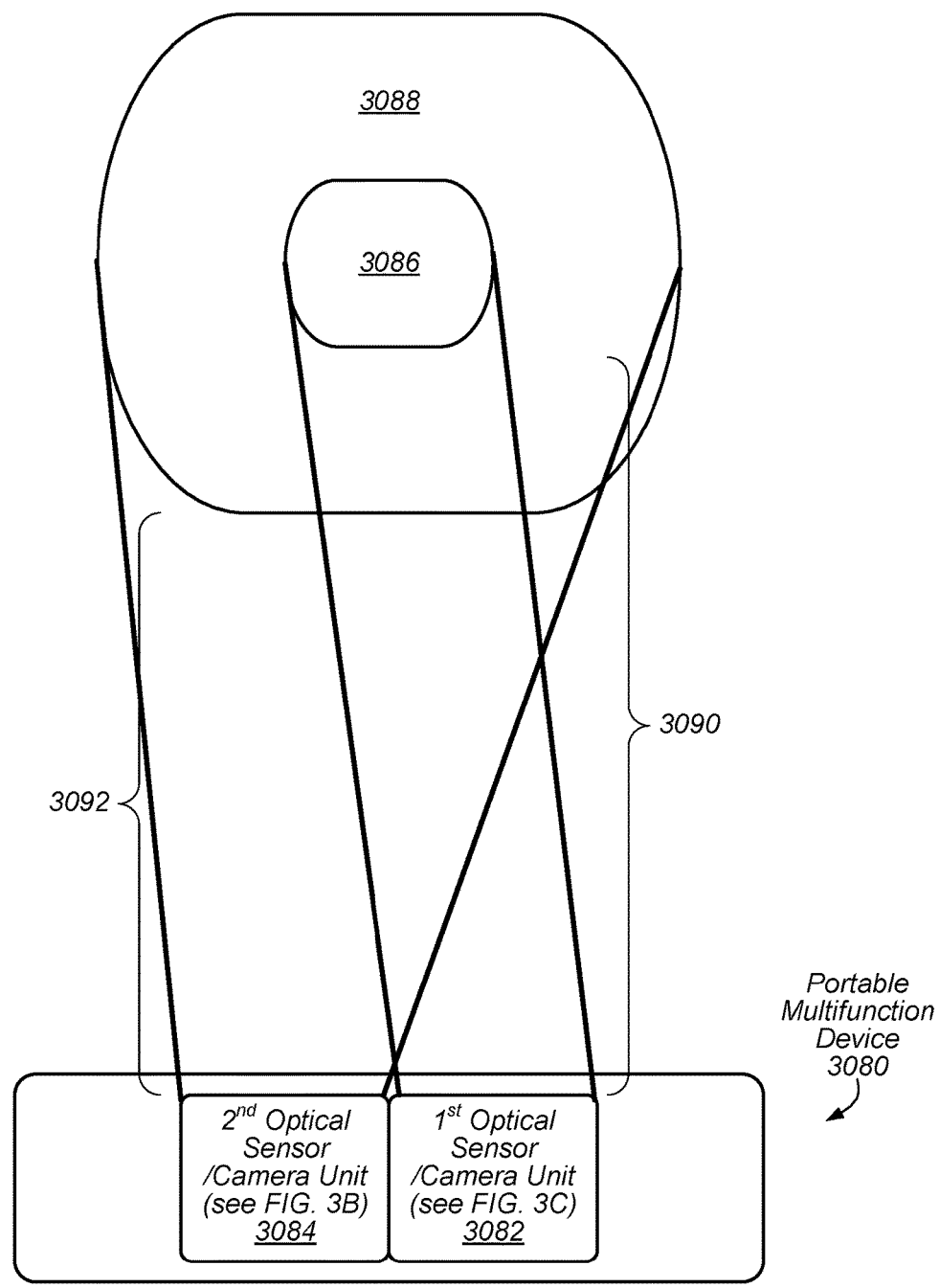
FIG. 3A illustrates a view of an example embodiment of camera module components arranged for multiple visual fields usable for a multiple camera system for portable zoom, according to at least some embodiments.

FIG. 3A illustrates a view of an example embodiment of camera module components arranged for multiple visual fields usable for a multiple camera system for portable zoom, according to at least some embodiments. A portable multifunction device 3080 includes a first optical sensor/camera unit 3082 with a first focal length 3090 for capturing a first visual field 3086 and a second optical sensor/camera unit 3084 with a first focal length 3092 for capturing a second visual field 3088.

Some embodiments include a first camera unit 3082 (such as one of the cameras described below with respect to FIG. 3B and FIG. 3C) of a multifunction device capturing a first image of a first visual field 3086. A second camera unit 3084 (such as one of the cameras described below with respect to FIG. 3B and FIG. 3C) of the multifunction device 3080 simultaneously captures a second image of a second visual field 3088. In some embodiments, the first camera unit 3082 includes a first optical package with a first focal length 3090. In some embodiments, the second camera unit 3084 includes a second optical package (described below with respect to FIG. 3B, below) with a second focal length 3092. In some embodiments, the first focal length 3090 is different from the second focal length 3092, and the first visual field 3086 is a subset of the second visual field 3088. In some embodiments, the first image and the second image are preserved to a storage medium as separate data structures.

In some embodiments, a camera system of a multifunction device 3080, includes a first camera unit 3082 of the multifunction device for capturing a first image of a first visual field 3086. In some embodiments, the first camera unit 3082 includes a first optical image stabilization actuator for moving a first optical package configured for a first focal length 3090. The camera system further includes second camera 3084 unit of the multifunction device 3080 for simultaneously capturing a second image of a second visual field 3088. In some embodiments, the second camera unit 3084 includes a second optical image stabilization actuator for moving a second optical package configured for a second focal length 3092. In some embodiments, the first focal length 3090 is different from the second focal length 3092. In some embodiments, the first focal length being different from the second focal length includes both the first focal length and the second focal length being adjustable ranges, which may or may not overlap.

Some embodiments assign metadata to the first image of the first visual field 3086 and the second image of the second visual field 3088 a time indexing feature for establishing that the first image of the first visual field 3086 and the second image of the second visual field 3088 correspond as having been simultaneously captured. Some embodiments display the first image of the first visual field 3086 in a screen interface with a control for switching to display of the second image of the second visual field 3088, and, responsive to an actuation of the control, display the second image of the second visual field 3088 in place of the first image. Some embodiments generate a synthetic intermediate image at least in part from data of the first image of the first visual field 3086 and data of the second image of the second visual field 3088. In some embodiments, the synthetic intermediate image has a third focal length different from each of the first focal length 3090 and the second focal length 3092, and the synthetic intermediate image has a third visual field different from each of the first visual field 3086 and the second visual field 3088. Some embodiments preserve storage of the first image of the first visual field 3086 and data of the second image of the second visual field 3088 after creation of the synthetic intermediate image.

Some embodiments generate a synthetic result image at least in part from data of the first image of the first visual field 3086 and data of the second image of the second visual field 3088. In some embodiments, the synthetic intermediate image has is generated by enhancing the first image of the first visual field 3086 using data from the second image of the second visual field 3088. Some embodiments display the first image of the first visual field 3086 and the second image of the second visual field 3088 in a shared screen interface.

Some embodiments include a camera system of a multifunction device. In some embodiments, the camera system includes a first camera unit 3082 of a multifunction device 3080 for capturing a first image of a first visual field 3086 and a second camera unit of the multifunction device for simultaneously capturing a second image of a second visual field 3088. In some embodiments, the first camera unit 3082 includes a first optical package configured for a first focal length 3090. In some embodiments, the second camera unit 3084 includes a second optical package configured for a second focal length 3092. In some embodiments, the first focal length 3090 is different from the second focal length 3092.

In some embodiments, the camera system includes a processing unit configured to assign to the first image of a first visual field 3086 and the second image a time indexing feature for establishing that the first image and the second image of a second visual field 3088 were simultaneously captured. In some embodiments, the first camera unit 3082 includes a lens having a folded lens configuration (not shown) with a longer focal length 3090 than a focal length 3092 of a lens of the second camera unit 3084, and the second visual field 3088 is centered on a second visual axis aligned with a first visual axis on which the first visual field 3086 is centered. In some embodiments, the first camera unit 3082 includes a first moveable lens (shown below with respect to FIG. 3B) and a first image sensor attached a chassis of the camera unit, the second camera unit includes a lens and a second image sensor moveably attached a chassis of the second camera unit 3084.

In some embodiments, the first camera unit 3082 includes a first moveable lens and a first image sensor attached a chassis of the first 3082 camera unit, and the second camera unit 3084 includes a lens (shown below with respect to FIG. 3B) and a second image sensor moveably attached a chassis of the second camera unit. In some embodiments, the first camera unit 3082 and the second camera unit 3084 include a first image processing pipeline and a second image processing pipeline, respectively.

In some embodiments, the first image and second image are of different media types. For example, in some embodiments, the first image is a moving image data structure captured at a first frame rate. In some embodiments, the second image is a moving image data structure captured at a second frame rate. In some embodiments, the second frame rate is faster than the first frame rate. In some embodiments, the first image is a still image taken at time t(0), and the second image is a moving image data structure captured over a time interval including t(0).

In some embodiments, the first image has a first resolution and the second image has a second resolution. An example of the use of a first image that is a moving image data structure at a first frame rate and a second image that is a moving image data structure at a second frame rate arises in that some embodiments include second camera module 3084 recording 720p (also known as 720 pixels of vertical resolution progressive scan) slow motion video at 240 frames per second while first camera module 3082 is capturing 4K (horizontal resolution on the order of 4,000 pixels) video at 30 frames per second. In some embodiments, the analog-to-digital converter bandwidth required for each separate module to achieve the recording is 220-270 Mpixels/s. Achieving the same functionality with conventional single camera module technology requires up to 32 times higher analog-to-digital converter bandwidth for a single camera module if it is compared to embodiments in which there is a 2x difference in focal length from wide to tele module, providing benefits in terms of power, thermal dissipation, storage bandwidth, storage capacity, and actual achievable frame rates combined with zoom capability.

A use case for some embodiments is well-illustrated with respect to sports photography. In one example use case, it is possible to imagine a user of portable multifunction device 3080 filming a batter in a baseball game. Recording video of the game with portable multifunction device 3080 from bleachers, not shown, a user may decide to zoom in to capture a batter swinging and hitting the ball in slow motion using second camera module 3084 recording 720p slow motion video at 240 frames per second, but may subsequently want to switch to the simultaneously captured 4K video from first camera module 3082 at 30 frames per second of resulting home run in high quality video of the full baseball field, to capture the moments where the opposing team scrambles to catch the ball and the batter is running from base to base. Some embodiments enable this mixed-video capture by simultaneously recording using second camera module 3084 as a telephoto camera module in a 240 frames per second slow motion mode while at the same time using first camera module 3082 as a wide camera module in a 4K at 30 frames per second. After capturing a data structure including both video streams the awesome moment, some embodiments provide for a mixed-video data structure and an interface for the video streams from the two separate camera modules to be manually or automatically edited and combined to create a more engaging media which may contain normal 1080p video, 4K high resolution video, 720p motion video, and still images. In the example described above, this mixed-video media both captures the close up expressions of players, the peak action in slow motion, and frames it all in the context of a great play in a baseball game.

Another example of a use case for some embodiments arises in the context of capturing a child extinguishing candles on a birthday cake. In such an example, one can imagine a child about to blow out the candles on the birthday cake while all her friends are singing a birthday song. In some embodiments, second camera module 3084 can be used as a telephoto camera module to zoom in on the face of the child as she is about to blow out the candles and first camera module 3082 can capture a burst of high resolution still images of her smiling face. In some embodiments, first camera module 3082 is simultaneously capturing standard 1080p 30 frames per second video of the entire group of kids gathered and singing around the cake. Some embodiments provide an editing interface for combining the video stream from the wide camera module, either manually or automatically, with the close up portraits to create a much more engaging media experience which can be shared. As the two camera modules are synchronized in time, the still images can easily be automatically inserted at the right time in a final video stream.

Figure 3B:
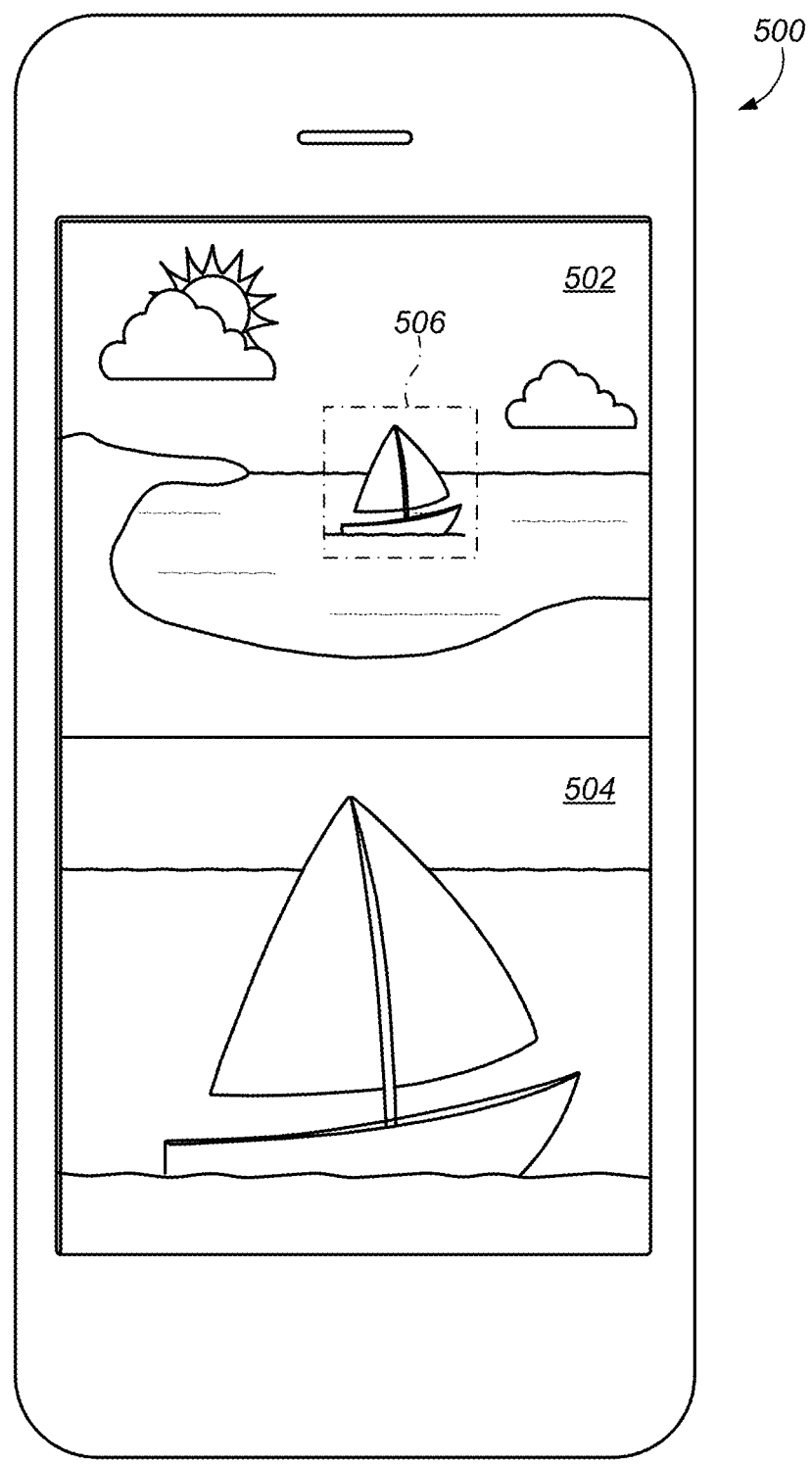
FIG. 3B illustrates a user interface for a multiple camera system for portable zoom, according to at least some embodiments.

FIG. 3B illustrates a user interface for a multiple camera system for portable zoom, according to at least some embodiments. A portable multifunction device 400 displays a first image of a first visual field 404 captured by a first camera unit and a second image of a second visual field 402 simultaneously captured by a second camera unit of the multifunction device 400. A zoom control 406 is displayed within first image of a first visual field 404. In the embodiment shown, zoom control 406 is an area of first image of first visual field 404, that, in response to control actuation through the touch screen of portable multifunction device 400, is used as a control for toggling the display mode for displaying first image of a first visual field 404 captured by a first camera unit and second image of a second visual field 402 simultaneously captured by a second camera unit of the multifunction device 400.

Some embodiments assign metadata to the first image 404 and the second image 402 for a time indexing feature for establishing that the first image 404 and the second image 402 correspond as having been simultaneously captured. Some embodiments display the first image 404 in a screen interface with a control (e.g., similar to control 406) for switching to display of the second image 402, and, responsive to an actuation of the control 406, display the second image 402 in place of the first image 404. Some embodiments generate a synthetic intermediate image at least in part from data of the first image 404 and data of the second image 402.

Figure 3C:
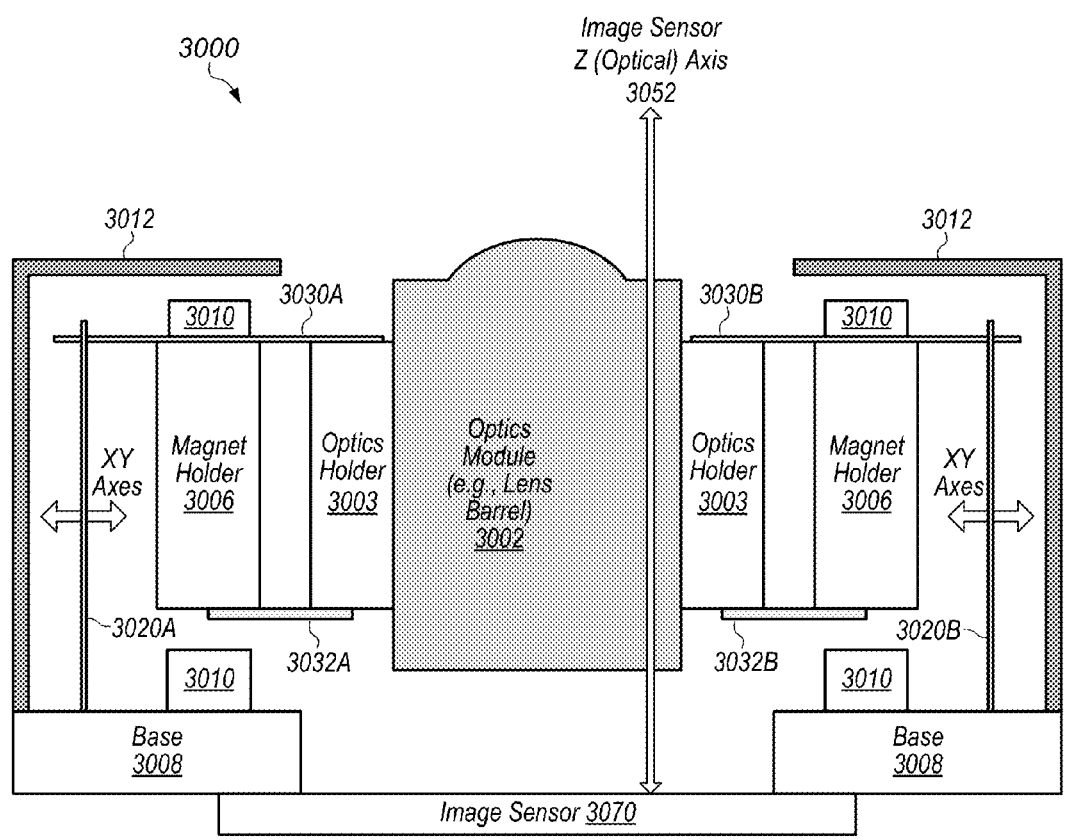
FIG. 3C depicts a side view of an example embodiment of camera module components usable for a multiple camera system for portable zoom with optical image stabilization, according to at least some embodiments.

FIG. 3C depicts a side view of an example embodiment of camera module, according to at least some embodiments. Camera module 3000, which is an embodiment of cameras 164a-b, discussed below includes camera components such as an optics module (e.g., a lens barrel) 3002 attached to an optics holder 3003 and a magnet holder 3006. An image sensor 3070, which may or may not be mounted on a substrate that is not shown separately in FIG. 3, is attached to a camera module base 3008. The camera components may further include, in addition to components such as power and remote control connections not shown, a cover 3012 and suspension wires 3020.

Optics module 3002 may be suspended on the base assembly 3008 by suspension of the upper springs 3030 and the suspension wires 3020. Camera components may include one or more of, but are not limited to, optics 3002, optics holder 3003, magnet holder(s) 3006, upper spring(s) 3030, and lower spring(s) 3032. The upper and lower spring(s) may be collectively referred to herein as optics springs. An optics module (e.g., a lens or lens assembly or lens barrel) 3002 may be screwed, mounted or otherwise held in or by an optics holder 3003. In at least some embodiments, the optics 3002/optics holder 3003 assembly may be suspended from or attached to the magnet holder 3006 by upper spring(s) 3030, and lower spring(s) 3032. Note that upper spring(s) 3030 and lower spring(s) 3032 are flexible to allow the optics assembly 3000 a range of motion along the Z (optical) axis for optical focusing, wires 3020 are flexible to allow a range of motion on the XY plane orthogonal to the optical axis for optical image stabilization.

Note that, in some embodiments, a camera may not include magnets and magnet holder(s) 3006, but may include a yoke or other structure 3006 that may be used to help support the optics assembly on suspension wires 3020 via upper springs 3030. In general, other embodiments of an optics assembly 3000 may include fewer or more components than the example optics assembly 3000 shown in FIG. 3. Also note that, while embodiments show the optics assembly 3000 suspended on wires 3020, other mechanisms may be used to suspend an optics assembly 3000 in other embodiments.

The autofocus yoke (e.g., magnet holder(s) 3006) acts as the support chassis structure for the autofocus mechanism of actuator 3000. The lens carrier (optics holder 3003) is suspended on the autofocus yoke by an upper autofocus (AF) spring 3030 and a lower optics spring 3032. In this way when an electric current is applied to the autofocus coil, Lorentz forces are developed due to the presence of the four magnets, and a force substantially parallel to the optical axis is generated to move the lens carrier, and hence lens, along the optical axis, relative to the support structure of the autofocus mechanism of the actuator, so as to focus the lens. In addition to suspending the lens carrier and substantially eliminating parasitic motions, the upper spring 3030 and lower spring 3032 also resist the Lorentz forces, and hence convert the forces to a displacement of the lens. This basic architecture shown in FIG. 3 is typical of some embodiments, in which optical image stabilization function includes moving the entire autofocus mechanism of the actuator (supported by the autofocus yoke) in linear directions orthogonal to the optical axis, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

In at least some embodiments, the suspension of the autofocus mechanism on the actuator 3000 support structure may be achieved by the use of four corner wires 3020, for example wires with a circular cross-section. Each wire 3020 acts as a flexure beams capable of bending with relatively low stiffness, thus allowing motion in both optical image stabilization degrees-of-freedom. However, wire 3020 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 3020 is stiff in directions that require it to change in length, and hence the fixed points at the ends of each wire (eight points in total) will substantially form the vertices of a parallelepiped for all operational positions of the optical image stabilization mechanism.

FIGS. 4A-D illustrate an example embodiment of camera module components including paired side magnet arrays usable for a multiple camera system for portable zoom, according to at least some embodiments.

Figure 4A:
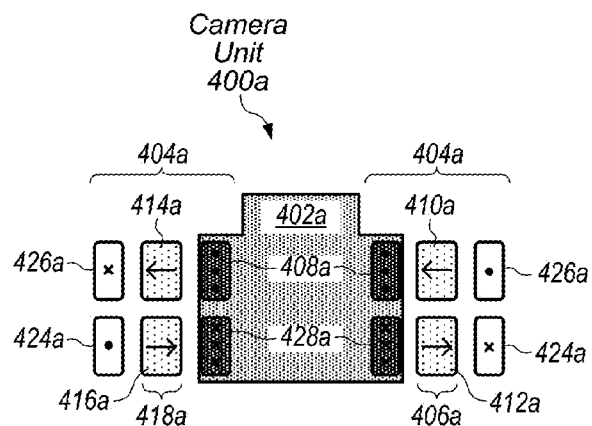
FIGS. 4A-D illustrate an example embodiment of camera module components including paired side magnet arrays usable for a multiple camera system for portable zoom, according to at least some embodiments.
Figure 4C:
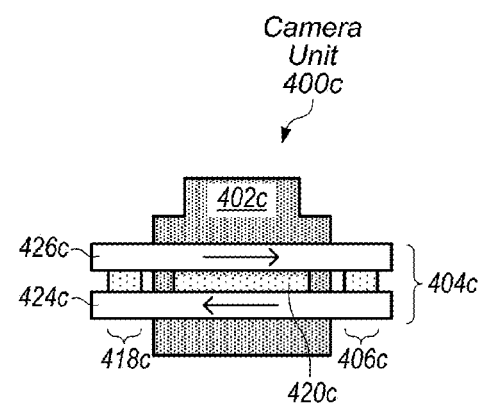
Figure 4B:
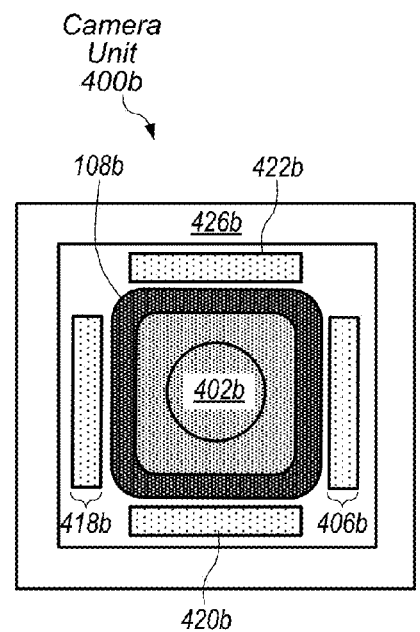
Figure 4D:
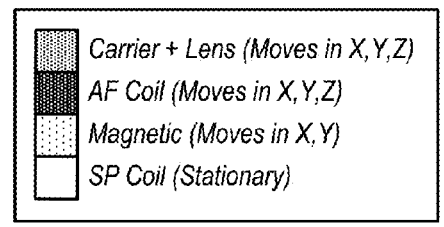

Each of FIGS. 4A-4C includes a different view of a camera unit 400*a-c*, which is one embodiment of a first camera unit or a second camera unit of a multifunction device for capturing a first image of a first or second visual field. Each of camera units 400*a-c* includes one of optics packages 402*a-c* and one of optical image stabilization actuators 404*a-c* for moving the optical package 402*a-c* configured for focal length or an adjustable range of focal lengths. FIG. 4D is a legend indicating the motion capability of various components illustrated in each of FIGS. 4A-C.

Optical stabilization actuators 404*a-c* include magnet arrays 406*a-c* and 418*a-c*, which include central magnet arrays 406*a-c* and distal magnet arrays 418*a-c*. In some embodiments, central magnet arrays 406*a-c* and distal magnet arrays 418*a-c* are arranged in opposing and mutually-cancelling pairs of magnets. Additionally, in some embodiments, lower magnet arrays 420*b-c* and upper magnet array 422*b* are arranged in analogous opposing and mutually-cancelling pairs. In some embodiments, the designation of central magnet arrays 406*a-c* and distal magnet arrays 418*a-c* is arbitrary, with the difference between them being the opposite and mutually cancelling arrangement of magnets in the respective arrays. In some embodiments, the designation of central magnet arrays 406*a-c* and distal magnet arrays 418*a-c* is defined with respect to a center line between a pair of camera units in a camera system, as described elsewhere herein.

As portrayed in FIGS. 4A-4D, camera units 400*a-c* include central magnet arrays 406*a-c*, which can be situated along the axis between the optics package of a first camera unit and an optics package of a second camera unit. Central magnet array 406*a* includes a central upper magnet 410*a* having a first polarity and a central lower magnet 412*a* having a polarity antiparallel to the first polarity. Camera units 400*a-c* also include distal magnet arrays 418*a-c* situated opposite the central magnet arrays 406*a-c* with respect to the optics packages 402*a-c* of the camera units 400*a-c*. Distal magnet array 418*a* includes a distal lower magnet 416*a* having the first polarity and a distal upper magnet 414*a* having the polarity antiparallel to the first polarity.

In some embodiments, camera units 400*a-c* include distal magnet arrays 418*a-c* that are situated opposite the central magnet arrays 406*a-c* with respect to the optics packages 402*a-c* of the camera units 400*a-c* and the distal magnet arrays 418*a-c* include a distal lower magnet 416*a* having the first polarity and a distal upper magnet 414*a* having the polarity antiparallel to the first polarity.

In some embodiments, camera units 400*a-c* include upper autofocus coils 408*a-b* and lower autofocus coils 428*a* attached to optics packages 402*a-c* for moving optics packages 402*a-c* in any of an X, Y, or Z axis, where, in some embodiments, the Z axis is the optical axis of optics packages 402*a-c* (thus, with at three degrees of freedom). In some embodiments, central magnet arrays 406*a-c* and distal magnet arrays 418*a-c* interact with upper latitudal SP coils 426*a-c* and lower SP latitudal coils 424*a* and 424*c*. As one of ordinary skill in the art will readily comprehend, while specific orientations of magnets FIGS. 4E-G depict an example embodiment of camera module components including paired side magnet arrays usable for a multiple camera system for portable zoom, according to at least some embodiments. Each of FIGS. 4E-4G includes a different view of a camera unit 400*e-g*, which is one embodiment of a first camera unit or a second camera unit of a multifunction device for capturing a first image of a first or second visual field. Each of camera units 400*e-g* includes one of optics packages 402*e-g* and one of optical image stabilization actuators 404*e* (not labeled in FIG. 4F or shown in FIG. 4G) for moving the optical package 402*e-g* configured for focal length or an adjustable range of focal lengths. FIG. 4H is a legend indicating the motion capability of various components illustrated in each of FIGS. 4E-G. As one of skill in the art will readily comprehend in light of having viewed the present disclosure, while particular orientations of magnets and directions of current are shown for the embodiments depicted herein, other embodiments exist, in which the direction of current and orientations of magnetic poles are reversed, and such embodiments are within the scope and intent of the present disclosure.

Optical stabilization actuator 404*e* includes magnet arrays 406*e-f* and 418*e-f*, which include central magnet arrays 406*e-f* and distal magnet arrays 418*e-f*. In some embodiments, central magnet arrays 406*e-f* and distal magnet arrays 418*e-f* are arranged in opposing and mutually-cancelling pairs of magnets. Additionally, in some embodiments, lower magnet arrays 420*f* and upper magnet array 422*f* are arranged in analogous opposing and mutually-cancelling pairs. In some embodiments, the designation of central magnet arrays 406*e-f* and distal magnet arrays 418*e-f* is arbitrary, with the difference between them being the opposite and mutually cancelling arrangement of magnets in the respective arrays. In some embodiments, the designation of central magnet arrays 406*e-f* and distal magnet arrays 418*e-f* is defined with respect to a center line between a pair of camera units in a camera system, as described elsewhere herein. In some embodiments, an optical package or optics module is a set of components (e.g., a lens barrel) housing one or more lens elements and other components for connecting a lens to an actuator for moving the lens relative to an image sensor.

As portrayed in FIGS. 4E-4G, camera units 400e-g include central magnet arrays 406e-f, which can be situated along the axis between the optics package of a first camera unit and an optics package of a second camera unit. Central magnet array 406e includes a central upper magnet 410e having a first polarity and a central lower magnet 412e having a polarity antiparallel to the first polarity. Camera units 400e-f also include distal magnet arrays 418e-f situated opposite the central magnet arrays 406e-f with respect to the optics packages 402e-g of the camera units 400e-g. Distal magnet array 418e includes a distal lower magnet 416e having the first polarity and a distal upper magnet 414e having the polarity antiparallel to the first polarity.

In some embodiments, camera units 400e-g include distal magnet arrays 418a-c that are situated opposite the central magnet arrays 406a-c with respect to the optics packages 402a-c of the camera units 400e-f and the distal magnet arrays 418e-f include a distal lower magnet 416e having the first polarity and a distal upper magnet 414e having the polarity antiparallel to the first polarity.

In some embodiments, camera units 400e-g include upper autofocus coils 408e-f and lower autofocus coils 428e attached to optics packages 402e-f for moving optics packages 402e-f in any of an X, Y, or Z axis, where, in some embodiments, the Z axis is the optical axis of optics packages 402e-f (thus, with at three degrees of freedom). In some embodiments, central magnet arrays 406e-f and distal magnet arrays 418e-f interact with central coils 426e and 426g and radial SP coils 424e-g.

Figure 4I:
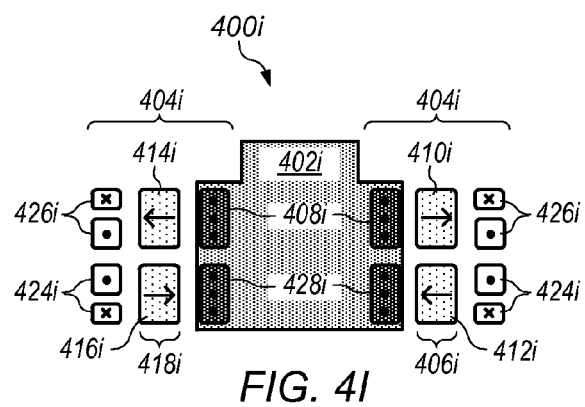
FIGS. 4I-L illustrate an example embodiment of camera module components including paired side magnet arrays usable for a multiple camera system for portable zoom, according to at least some embodiments.
Figure 4K:
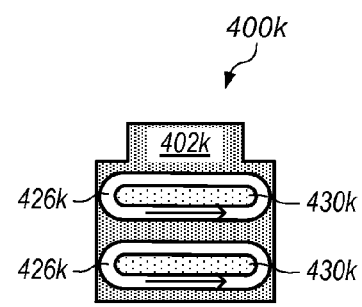
Figure 4J:
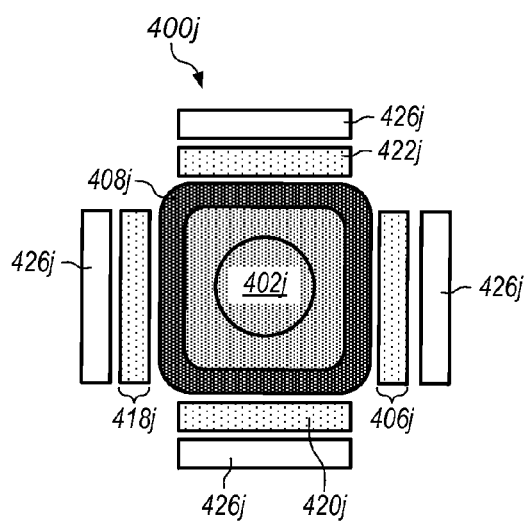
Figure 4L:
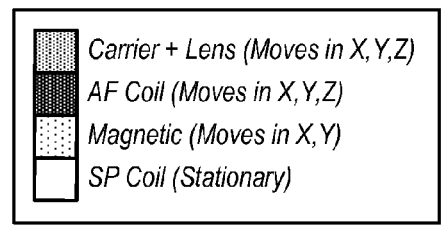

FIGS. 4I-L illustrate an example embodiment of camera module components including paired side magnet arrays usable for a multiple camera system for portable zoom, according to at least some embodiments. Each of FIGS. 4I-4K includes a different view of a camera unit 400i-k, which is one embodiment of a first camera unit or a second camera unit of a multifunction device for capturing a first image of a first or second visual field. Each of camera units 400i-k includes one of optics packages 402i-k and one of optical image stabilization actuators 404i (not labeled in FIG. 4J or shown in FIG. 4K) for moving the optical package 402i-j configured for focal length or an adjustable range of focal lengths. FIG. 4L is a legend indicating the motion capability of various components illustrated in each of FIGS. 4I-J.

Optical stabilization actuator 404i includes magnet arrays 406i-j and 418i-j, which include central magnet arrays 406i-j and distal magnet arrays 418i-j. In some embodiments, central magnet arrays 406i-j and distal magnet arrays 418i-j are arranged in opposing and mutually-cancelling pairs of magnets. Additionally, in some embodiments, lower magnet array 420j and upper magnet array 422j are arranged in analogous opposing and mutually-cancelling pairs. In some embodiments, the designation of central magnet arrays 406i-j and distal magnet arrays 418i-j is arbitrary, with the difference between them being the opposite and mutually cancelling arrangement of magnets in the respective arrays. In some embodiments, the designation of central magnet arrays 406i-j and distal magnet arrays 418i-j is defined with respect to a center line between a pair of camera units in a camera system, as described elsewhere herein.

As portrayed in FIGS. 4i-4k, camera units 400i-k include central magnet arrays 406i-j, which can be situated along the axis between the optics package of a first camera unit and an optics package of a second camera unit. Central magnet array 406i includes a central upper magnet 410i having a first polarity and a central lower magnet 412i having a polarity antiparallel to the first polarity. Camera units 400i-j also include distal magnet arrays 418i-j situated opposite the central magnet arrays 406i-j with respect to the optics packages 402i-j of the camera units 400i-j. Distal magnet array 418i includes a distal lower magnet 416i having the first polarity and a distal upper magnet 414i having the polarity antiparallel to the first polarity.

In some embodiments, camera units 400i-j include distal magnet arrays 418i-j that are situated opposite the central magnet arrays 406i-i with respect to the optics packages 402i-j of the camera units 400i-j and the distal magnet arrays 418i-j include a distal lower magnet 416i having the first polarity and a distal upper magnet 414i having the polarity antiparallel to the first polarity.

In some embodiments, camera units 400i-j include upper autofocus coils 408i-j and lower autofocus coils 428j attached to optics packages 402i-j for moving optics packages 402i-j in any of an X, Y, or Z axis, where, in some embodiments, the Z axis is the optical axis of optics packages 402e-f (thus, with at three degrees of freedom). In some embodiments, central magnet arrays 406i-j and distal magnet arrays 418i-j interact with top SP coils 426i-j and lower SP coils 424i and 424k.

Figure 5:
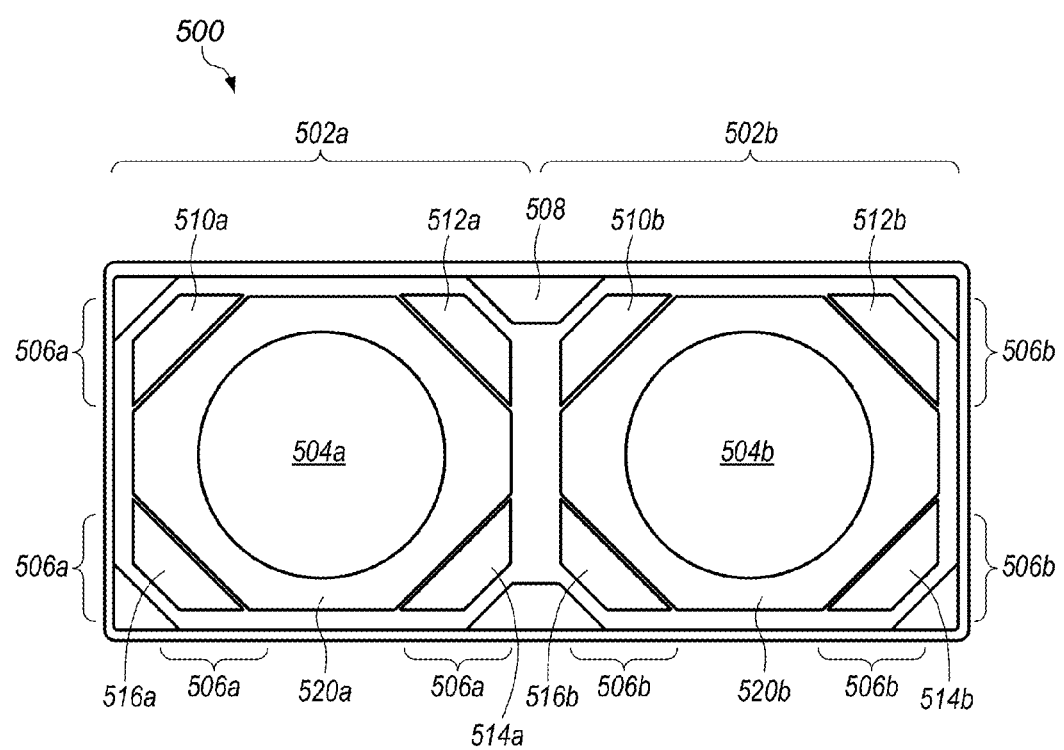
FIG. 5 depicts an example embodiment of camera modules including corner magnets in a shared magnet holder usable for a multiple camera system for portable zoom, according to at least some embodiments.
Figure 6A:
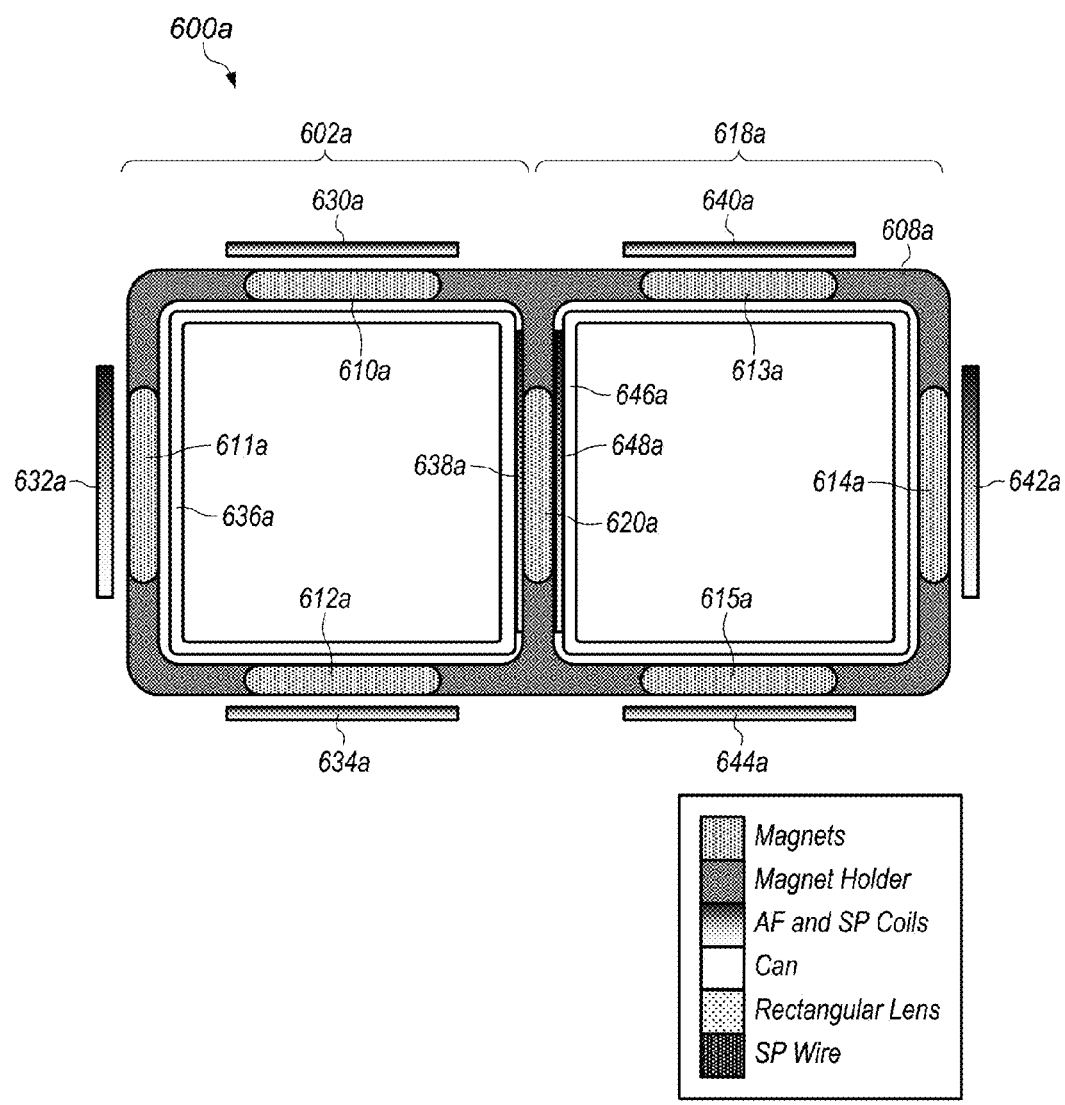
FIGS. 6A-E illustrate an example embodiment of camera module components including shared magnets usable for a multiple camera system for portable zoom, according to at least some embodiments.
Figure 6B:
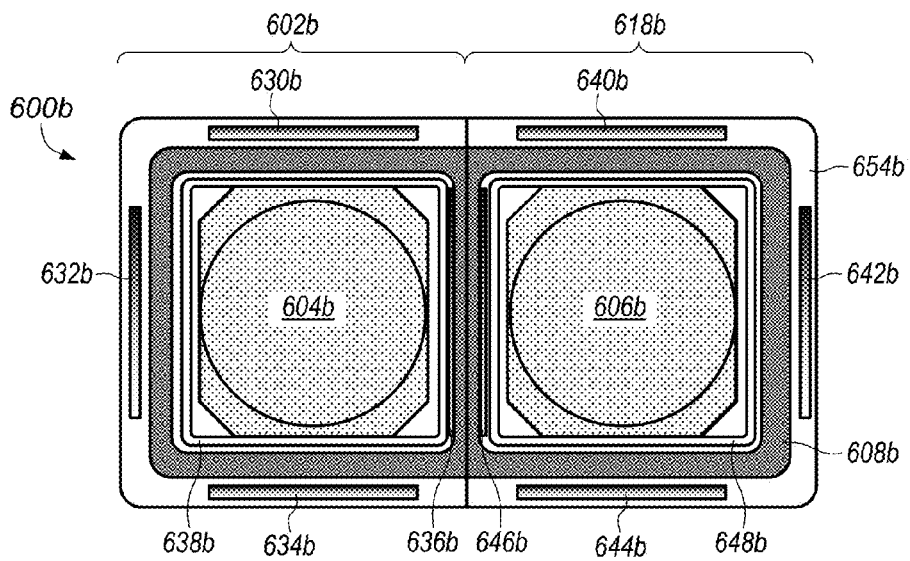
Figure 6C:
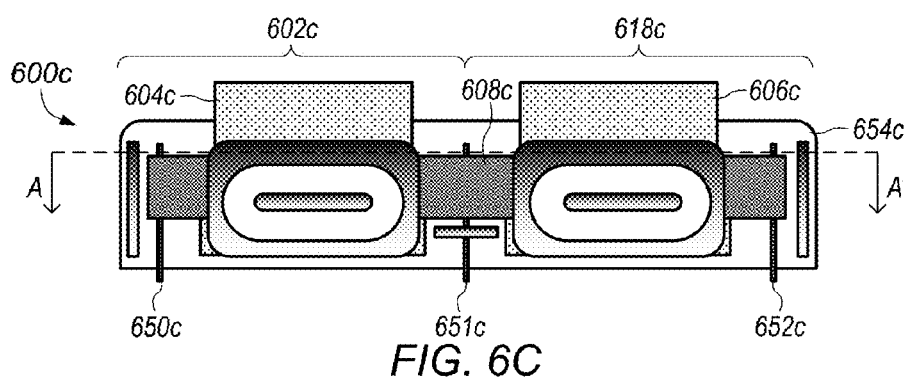
Figure 6D:
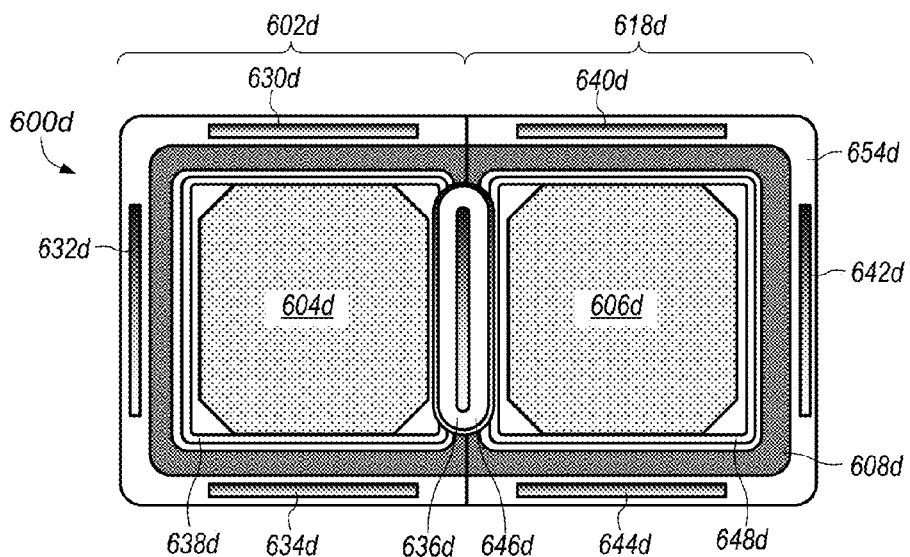
Figure 6E:
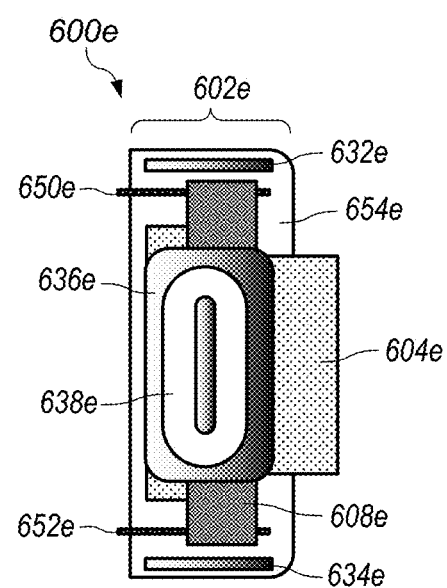

FIG. 5 depicts an example embodiment of camera modules including corner magnets in a shared magnet holder usable for a multiple camera system for portable zoom, according to at least some embodiments.

In some embodiments, the VCM applies the same OIS correction to both modules together at any given time. In some embodiments, OIS correction is a function of focal length and is different for the two modules. Thus, at any given moment the VCM can stabilize only one module.

In some embodiments, video capture involves shooting with only one lens at a time and the VCM can successfully command OIS correction as user switches between the 1× and 4× lenses.

In some embodiments, image fusion combines the wide field of view from a 1× lens and the narrow focus from a 4× lens to produce a wide angle image with extra detail and sharpness around the subject (image center). It can also be used to generate depth data (stereo vision). In some embodiments, dual OIS solution allows commanding different corrections on the two OIS modules simultaneously. In some embodiments, in fast exposure and shots with low subject motion, the two OIS corrections can be applied in succession producing the same effect.

A dual camera unit 500 includes one embodiment of a first camera unit 502a and a second camera unit 502b of a multifunction device for capturing a first image of a first or second visual field. Each of camera units 500a-b includes one of optics packages (circular feature) 504a-b and one of optical image stabilization actuators 506a-b using autofocus coils 520a-b for moving the optical package 506a-b configured for focal length or an adjustable range of focal lengths.

In some embodiments, the camera system of dual camera unit 500 includes a shared magnet holder 508 to which are attached one or more magnets 510a-516a of the first camera unit and one or more magnets 510b-516b of the second camera unit used to generate magnetic fields usable in creating motion in one or more of the first camera actuator 506a and the second camera actuator 506b. In some embodiments, the camera system of dual camera unit 500 includes a shared magnet holder 508 to which are attached one or more diagonal-angled corner magnets 510a-516a of the first camera unit and one or more diagonal-angled corner magnets 510b-516b of the second camera unit used to generate magnetic fields usable in creating motion in one or more of the first camera actuator 506a and the second camera actuator 506b, though other embodiments may employ shared magnet holder 508 with linear magnet pairs or linear magnets as described elsewhere herein.

FIGS. 6A-E illustrate an example embodiment of camera module components including shared magnets usable for a multiple camera system for portable zoom, according to at least some embodiments. In some embodiments, by using side magnets the VCMs can share one magnet between the two modules. In some embodiments, a shared magnet helps reduce the lens center to center distance i.e. parallax reduction (as well as over all size. A square design also permits symmetric dynamics. In some embodiments, the VCM applies the same OIS correction to both modules together at any given time. In some embodiments, OIS correction is a function of focal length and is different for the two modules. Thus, at any given moment the VCM in some embodiments stabilizes only one module.

In some embodiments, capture involves shooting with only one lens at a time and the VCM can successfully command OIS correction as user switches between the 1× and 4× lenses. In some embodiments, image fusion combines the wide field of view from the 1× lens and the narrow focus from the 4× lens to produce a wide angle image with extra detail and sharpness around the subject (image center). In some embodiments, it can also be used to generate depth data (stereo vision).

A dual camera unit 600a-e includes one embodiment of a first camera unit 602a-e and a second camera unit 618a-d of a multifunction device for capturing a first image of a first or second visual field. Each of camera units 602a-e and 618a-d includes one of optics packages 604b-e and 606b-d and actuator components for moving the optical packages 604b-e and 606b-d configured for focal length or an adjustable range of focal lengths. In some embodiments, the camera system of dual camera unit 600a-e includes a shared magnet holder 608a-e to which are attached one or more shared magnets 620a and one or more unshared magnets 610a-612a of the first camera unit 602a-e and one or more magnets 613a-615a of the second camera unit 618a-d used to generate magnetic fields usable in creating motion in one or more of the first camera unit 602a-e and the second camera unit 618a-d. In some embodiments, the camera system of dual camera unit 600a-e includes coils 630a-638e of the first camera unit 602a-e and one or more coils 640a-648e of the second camera unit used to generate force usable in creating motion in one or more of the first camera unit 602a-e and the second camera unit 618a-d. Suspension wires 650c-652e and a covering can 654b-e are also shown. In some embodiments, coil 636b-d and coil 646b-d are a single shared coil. In some embodiments, shared magnet holder 608a-e is a pair of separate units articulated together.

Figure 7A:
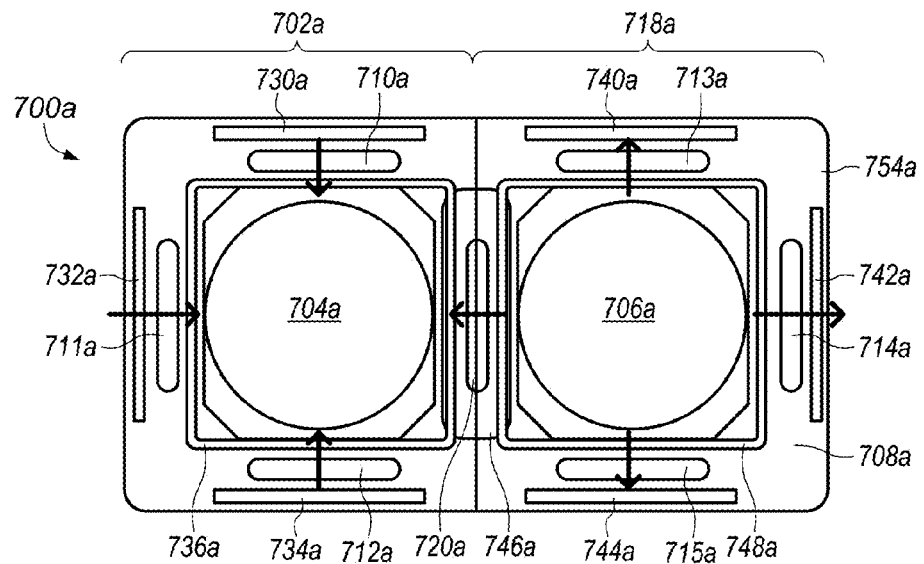
FIGS. 7A-C illustrate an example embodiment of camera module components including shared magnets usable for a multiple camera system for portable zoom, according to at least some embodiments.
Figure 7B:
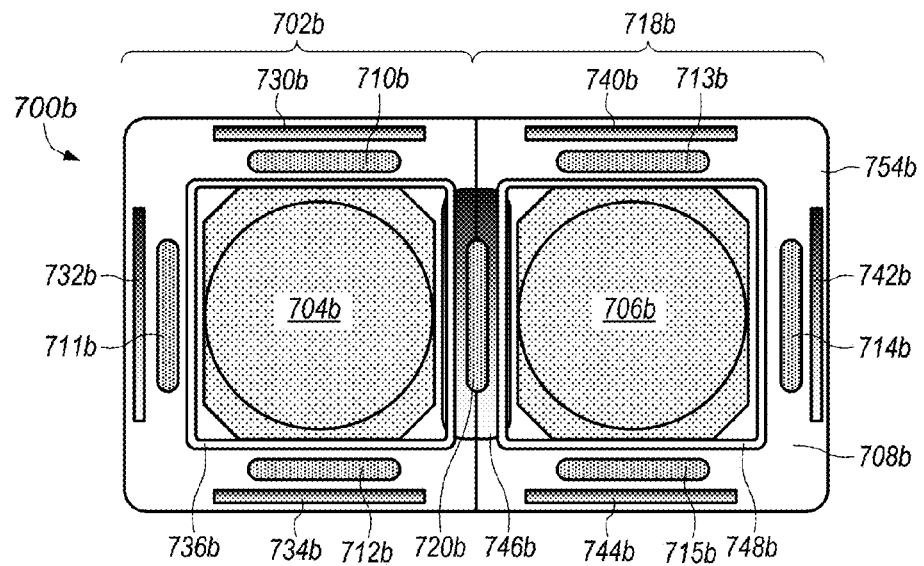
Figure 7B:
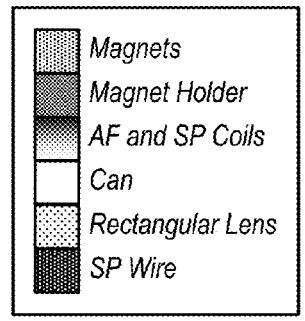
Figure 7C:
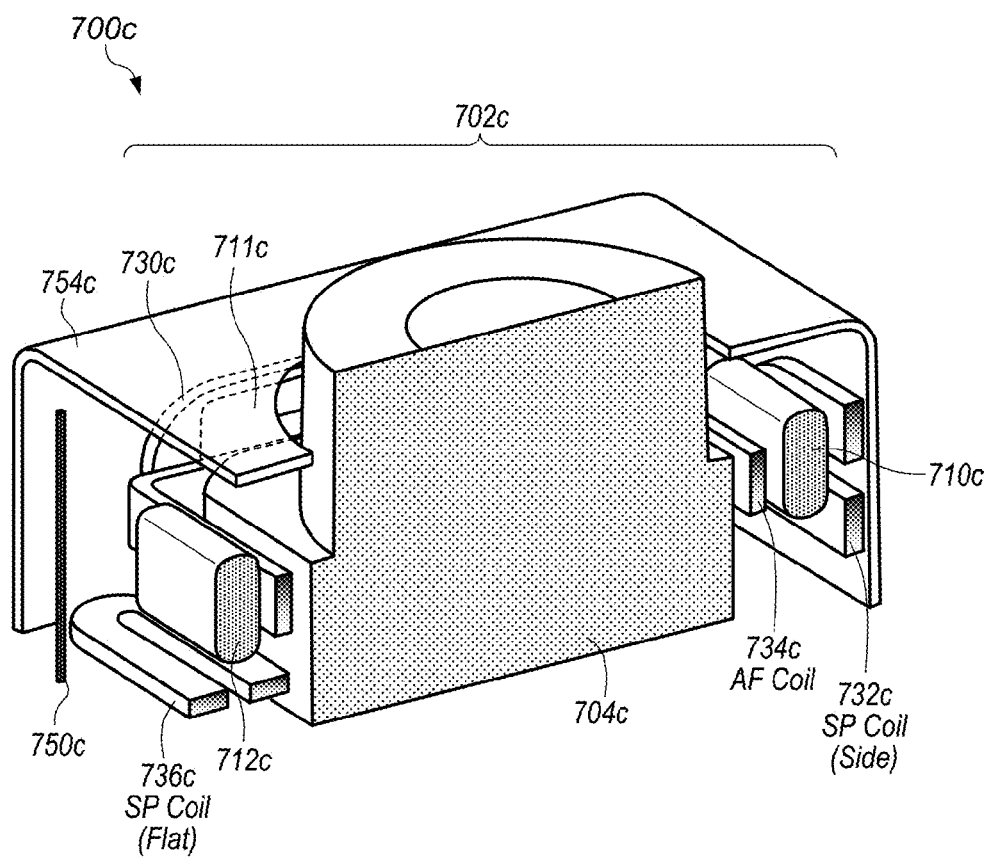

FIGS. 7A-C illustrate an example embodiment of camera module components including shared magnets usable for a multiple camera system for portable zoom, according to at least some embodiments. A dual camera unit 700a-c includes one embodiment of a first camera unit 702a-c and a second camera unit 718a-b of a multifunction device for capturing a first image of a first or second visual field. Each of camera units 702a-c and 718a-b includes one of optics packages 704a-c and 706a-b and actuator components for moving the optical packages 704a-c and 706a-b configured for focal length or an adjustable range of focal lengths. In some embodiments, the camera system of dual camera unit 700a-c includes a shared magnet holder 708a-b to which are attached one or more shared magnets 720a and one or more unshared magnets 710a-712a of the first camera unit 702a-c and one or more magnets 713a-715a of the second camera unit 718a-b used to generate magnetic fields usable in creating motion in one or more of the first camera unit 702a-c and the second camera unit 718a-d. In some embodiments, the indicated magnetic field directions of all of shared magnet 720a and one or more unshared magnets 710a-712a of the first camera unit 702a-c are oriented inward toward optics packages 704a-c while the indicated magnetic field directions of all of shared magnet 720a and one or more magnets 713a-715a of the second camera unit 718a-b are oriented outward away from optics packages 704a-b.

In some embodiments, the camera system of dual camera unit 700a-e includes coils 730a-736c of the first camera unit 702a-c and one or more coils 740a-744b of the second camera unit used to generate force usable in creating motion in one or more of the first camera unit 702a-c and the second camera unit 718a-b. Suspension wires 750c and a covering can 754a-c are also shown. In some embodiments, coil 746a-b is a single shared coil. In some embodiments, shared magnet holder 708a-b is a pair of separate units articulated together.

FIGS. 8A-E illustrate an example embodiment of camera module components including stationary magnets usable for a multiple camera system for portable zoom, according to at least some embodiments. In some embodiments, the VCM architecture of FIGS. 8A-E is based on a stationary magnet design, allowing for two OIS VCMs to be placed side to side with reduced stroke loss due to magnetic interactions between the two. In some embodiments, the VCMs can be used to independently command the required OIS corrections on the two modules.

In some embodiments, the current design allows for inclusion of 3 different independent drive channels (Drive X, Drive Y, Drive Z) and a 4th Auxiliary channel for Zoom or Electrochromic aperture.

Camera units 802a-c include one embodiment of a first camera unit and/or a second camera unit of a multifunction device for capturing a first image of a first or second visual field. Each of camera units 802a-c includes one of optics carriers 804a-b containing an optics package and actuator components for moving the optical packages in optics carriers 804a-b configured for focal length or an adjustable range of focal lengths.

In some embodiments, the camera systems of camera units 802a-c include one or more stationary magnets 810a-816a of the camera units 802a-c to generate magnetic fields usable in creating motion in one or more of the camera unit 802a-c.

In some embodiments, the camera system of camera units 802a-c includes coils 830b-832b set in a coil base 828a-c and coil holder 826a-b of the camera unit 802a-c used to generate force usable in creating motion in the camera unit 802a-c. Suspension and control wires 858a-872b provide for both suspension and transmission of control and data signals. A coil race track 832b-838c and a base 840b-c are also shown. Wires 870a-872a provide AF (+/−) signals. Wires 858a-860a provide Aux (+/−) signals. Wires 862a-864a provide SP_X (+/−) signals. Wires 866a-868a provide SP_Y (+/−) signals.

Figure 8A:
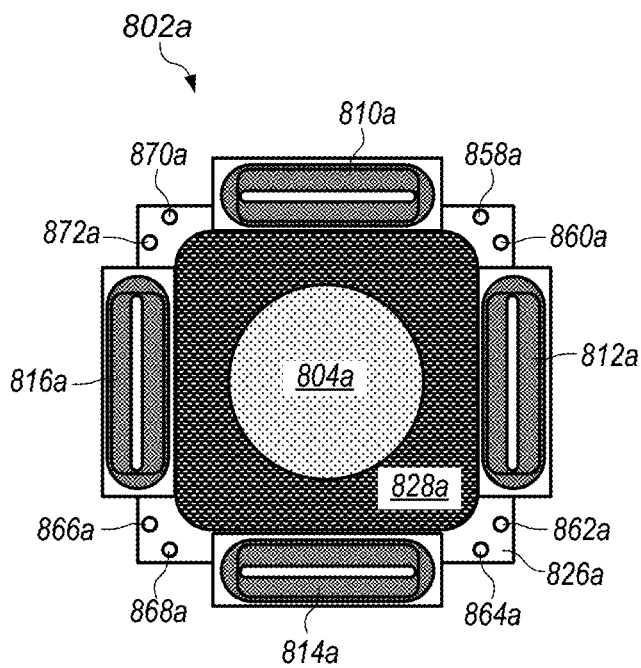
FIGS. 8A-E illustrate an example embodiment of camera module components including stationary magnets usable for a multiple camera system for portable zoom, according to at least some embodiments.
Figure 8E:
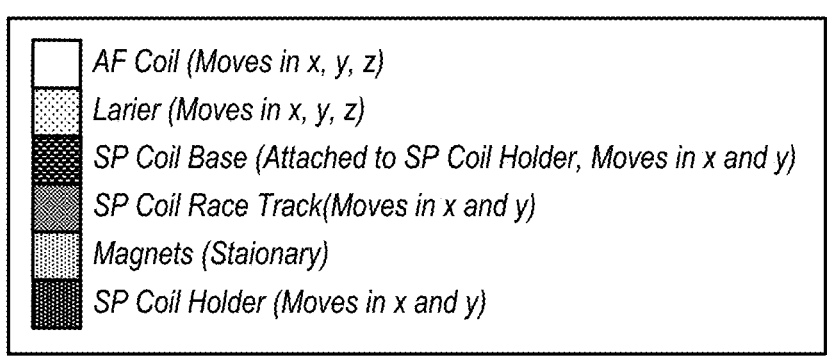
Figure 8B:
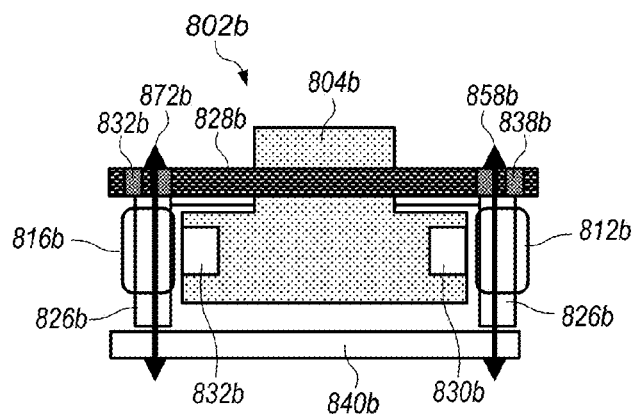
Figure 8C:
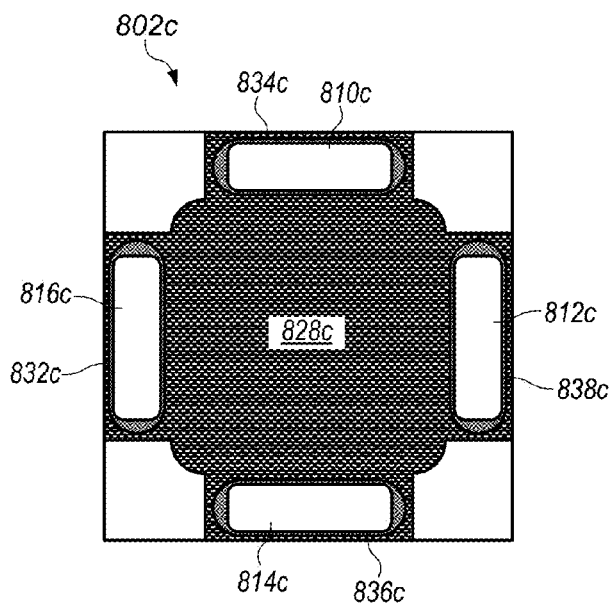
Figure 8D:
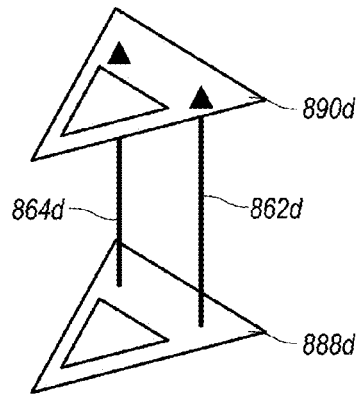

FIG. 8E contains a legend for understanding the various parts of FIGS. 8A-8C. FIG. 8D shows articulation of control wires 862a-864a to frames 888d-890d.

FIGS. 9A-D depict an example embodiment of camera module components including stationary magnets usable for a multiple camera system for portable zoom, according to at least some embodiments. Dual camera units 900a-c include embodiments of a first camera unit 902a-c and a second camera unit 918a-c of a multifunction device for capturing a first image of a first or second visual field.

Each of camera units 902a-c and 918a-c includes one of optics packages 904a-b and 909a-b and actuator components for moving the optical packages 904a-b and 909a-b configured for focal length or an adjustable range of focal lengths.

Figure 9A:
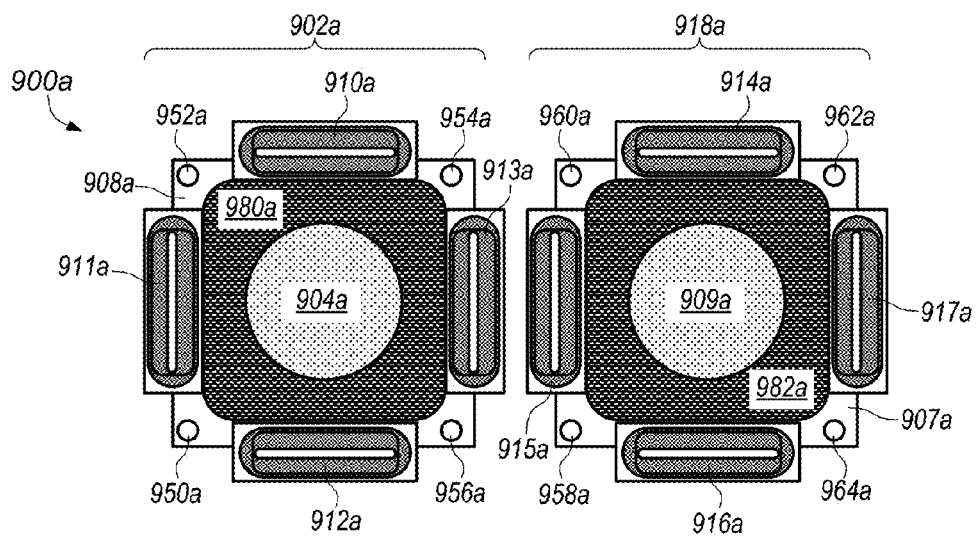
FIGS. 9A-D depict an example embodiment of camera module components including stationary magnets usable for a multiple camera system for portable zoom, according to at least some embodiments.
Figure 9B:
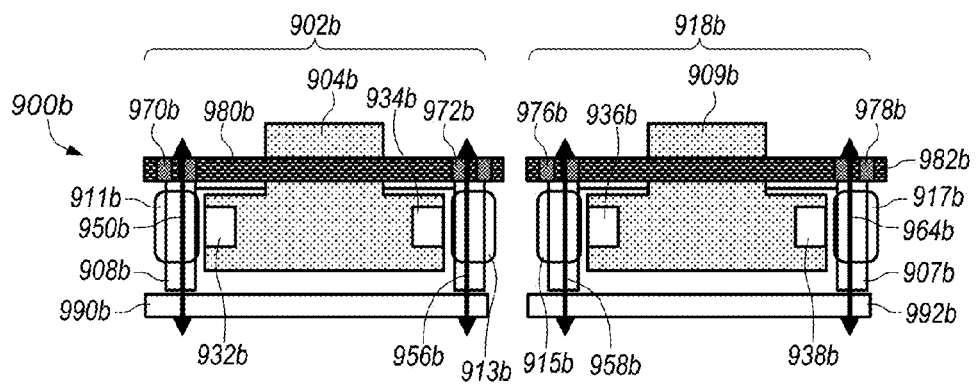
Figure 9C:
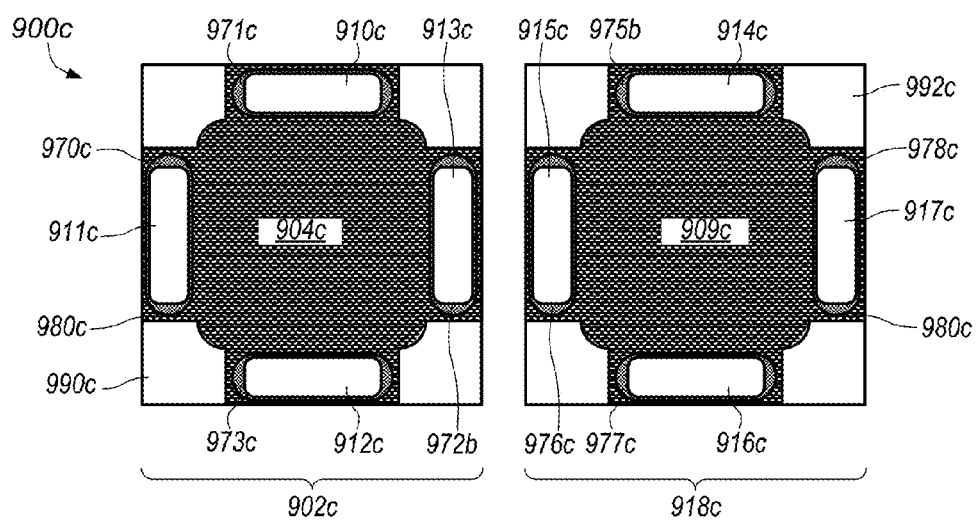
Figure 9D:
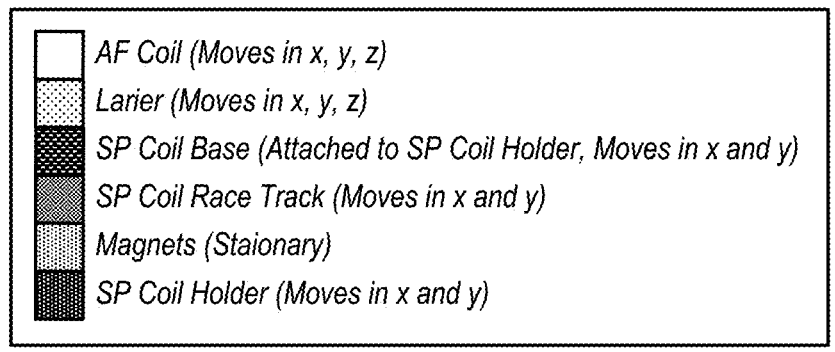

In some embodiments, the camera system of dual camera unit 900a-c includes independent magnet holders 907a-908b to which are attached one or more one or more unshared magnets 910a-913c of the first camera unit 902a-c and one or more magnets 914a-917c of the second camera unit 918a-c used to generate magnetic fields usable in creating motion in one or more of the first camera unit 902a-c and the second camera unit 918a-c. In some embodiments, the camera system of dual camera unit 900a-c includes coils 932b-934b of the first camera unit 902b and one or more coils 936b-938b of the second camera unit used to generate force usable in creating motion in one or more of the first camera unit 902a-c and the second camera unit 918a-c. Suspension wires 950a-964b are also shown. Coil bases 980a-982c, actuator bases 990b-992c, and SP coil race tracks 970b-978c. FIG. 9D is a legend illustrating the components of FIGS. 9A-9C.

FIGS. 10A-D illustrate an example embodiment of camera module components including stationary magnets usable for a multiple camera system for portable zoom, according to at least some embodiments. Dual camera units 1000a-c include embodiments of a first camera unit 1002a-c sharing a magnet 1015a-1015c a second camera unit 1018a-c of a multifunction device for capturing a first image of a first or second visual field.

Each of camera units 1002a-c and 1018a-c includes one of optics packages 1004a-b and 1009a-b and actuator components for moving the optical packages 1004a-b and 1009a-b configured for focal length or an adjustable range of focal lengths.

Figure 10A:
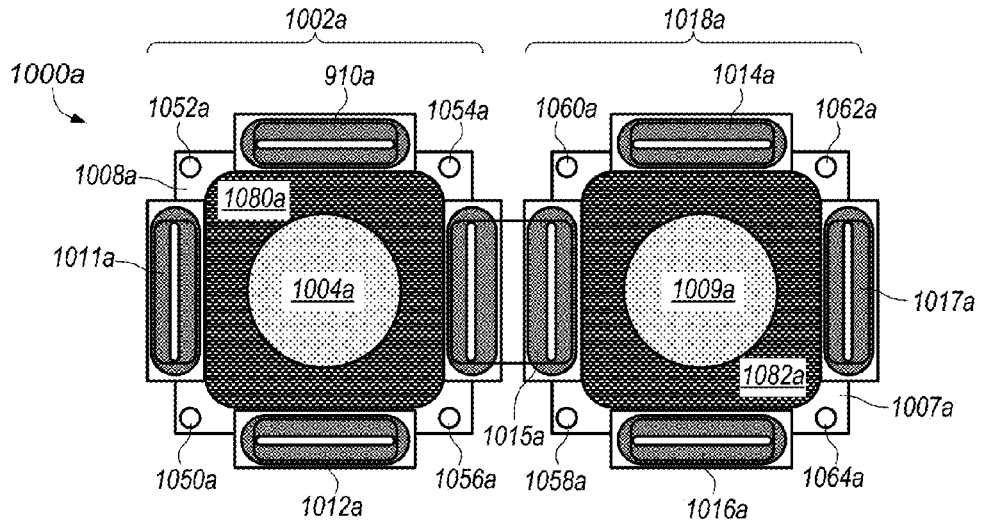
FIGS. 10A-D illustrate an example embodiment of camera module components including stationary magnets usable for a multiple camera system for portable zoom, according to at least some embodiments.
Figure 10B:
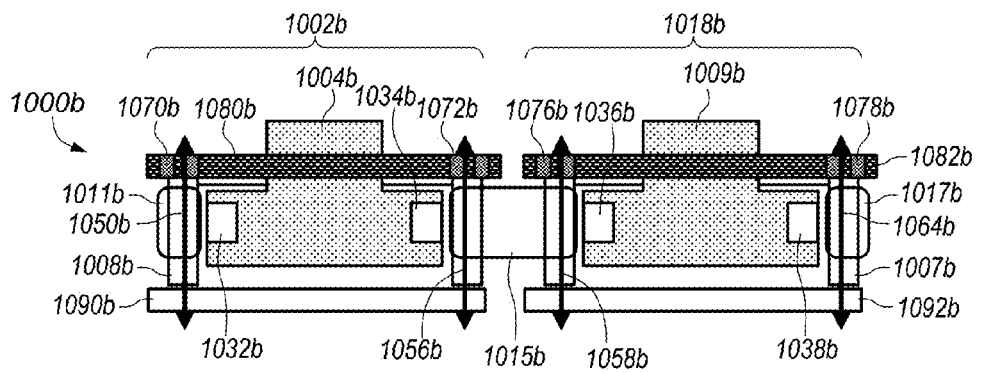
Figure 10C:
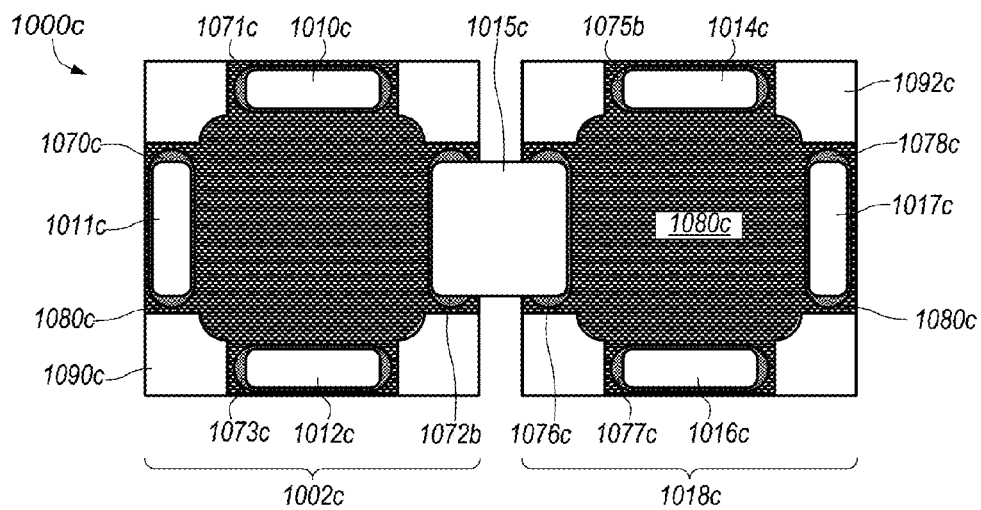
Figure 10D:
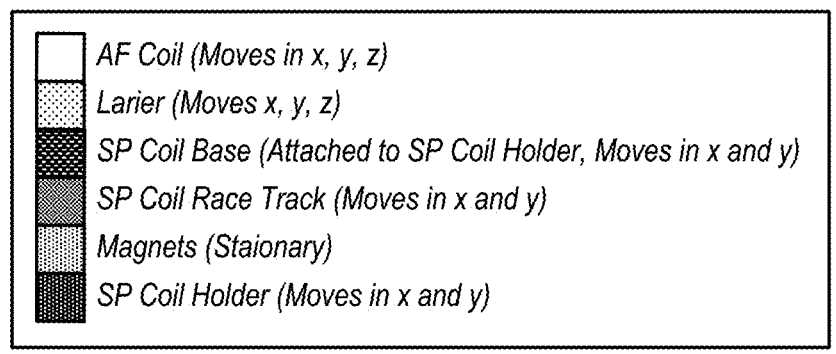
Figure 12A:
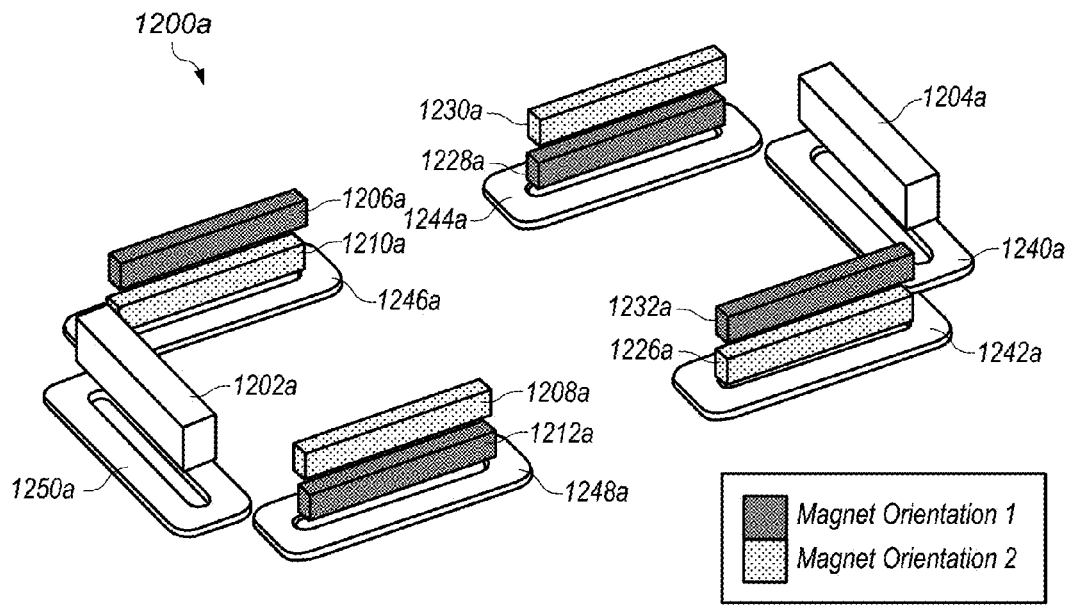
Figure 12B:
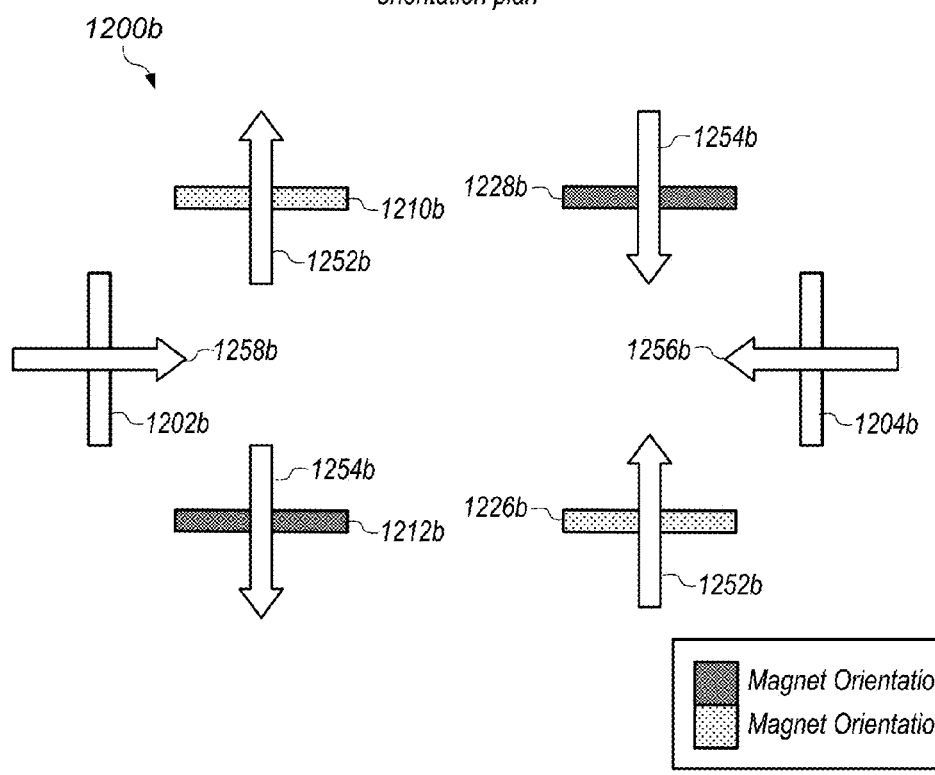
Figure 12C:
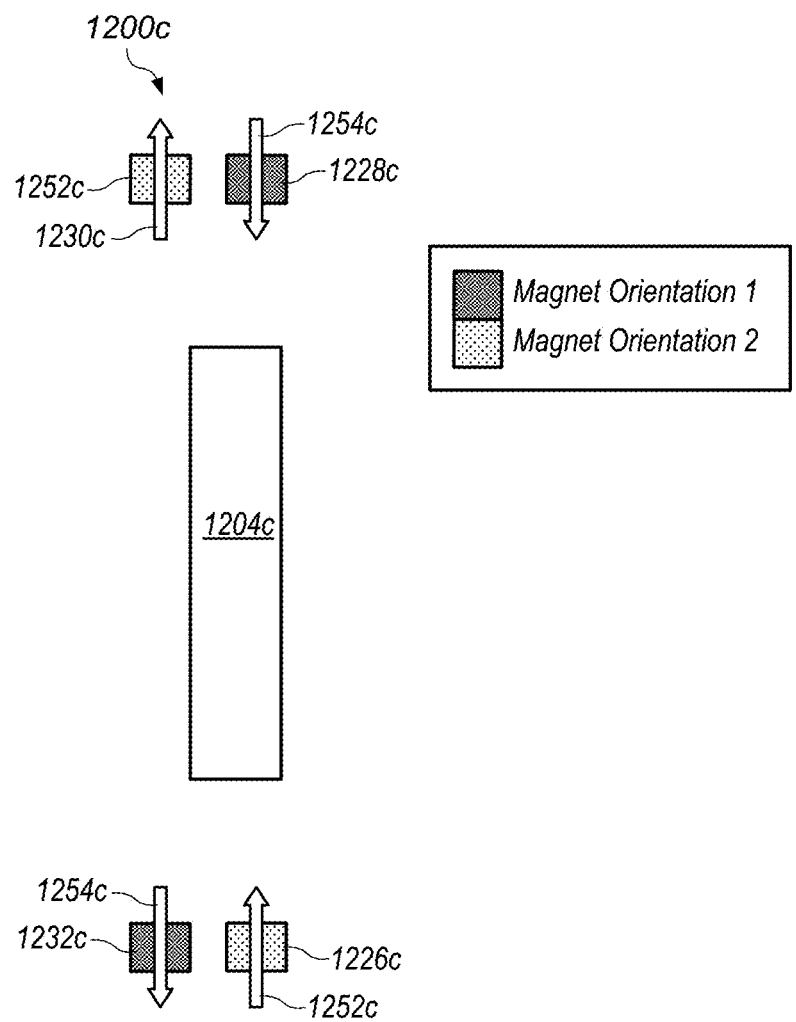
Figure 12G:
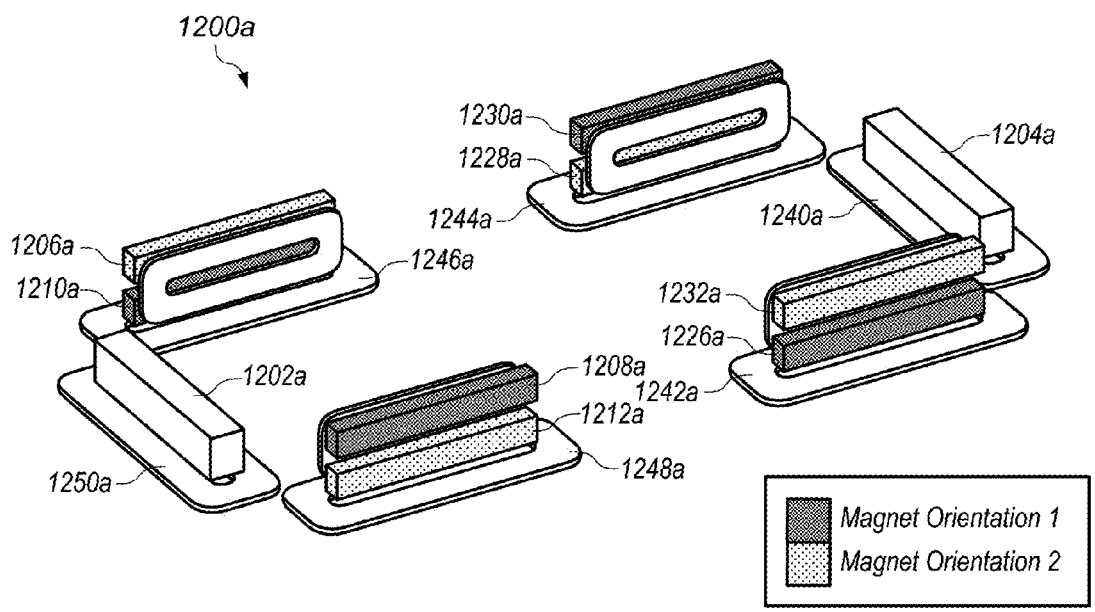

In some embodiments, the camera system of dual camera unit 1000a-c includes independent magnet holders 1007a-1008b to which are attached one or more one or more unshared magnets 1010a-1013c of the first camera unit 1002a-c and one or more magnets 1014a-c, shared magnets 1015a-c and 1016a-1017c of the second camera unit 1018a-c used to generate magnetic fields usable in creating motion in one or more of the first camera unit 1002a-c and the second camera unit 1018a-c. In some embodiments, the camera system of dual camera unit 1000a-c includes coils 1032b-1034b of the first camera unit 1002b and one or more coils 1036b-1038b of the second camera unit used to generate force usable in creating motion in one or more of the first camera unit 1002a-c and the second camera unit 1018a-c. Suspension wires 1050a-1064b are also shown. Coil bases 1080a-1082c, actuator bases 1090b-1092c, and SP coil race tracks 1070b-1078c. FIG. 10D is a legend illustrating the components of FIGS. 10A-10C.

FIGS. 11A-C depict an example embodiment of camera module components including shielded magnets usable for a multiple camera system for portable zoom, according to at least some embodiments. Some embodiments use high permeability metal to shield the magnetic field restricting it to stay within the magnet holder, thereby limiting undesirable interaction forces or disturbances from nearby magnetic materials or stray fields from other electro magnetic devices. An example using high permeability 1010 steel is shown in FIGS. 11A-11C. In some embodiments, shielding material is coated or glued or insert molded into a plastic magnet holder. In some embodiments, shielding material is used to make the entire magnet holder (e.g., in metal injection molding).

Each of camera units 1102a-1104a includes one of optics carriers 1106a, 1106b and 1108a containing an optics package and actuator components for moving the optical packages in optics carriers 1106a-b and 1108a configured for focal length or an adjustable range of focal lengths.

In some embodiments, the camera systems of camera units 1102a-1104a include one or more magnets 1110a-1116a and 1110b of the camera units 1102a-1104a with metallic shields 1120a-1126a and 1120b of thickness t 1128b set in magnet holders 1130a-1136a and 1130b to generate magnetic fields usable in creating motion in one or more of the camera unit 1102a-1104a. In some embodiments, camera units 1102a-1104a operate independently.

In some embodiments, the camera system of camera units 1102a-c includes coils 1140a-1146a and 1140b set in a coil base 11211a-c and coil holder 1126a-b of the camera unit 1102a-c used to generate force usable in creating motion in the camera unit 1102a-c for movement relative to bases 1152a-1154a. FIG. 11C is a legend for use with FIGS. 11A-11B.

FIGS. 12A-G depict example embodiments of camera module components including arrays of magnets omitting a center magnet between modules and usable for a multiple camera system for portable zoom, according to at least some embodiments. Some embodiments use a magnet arrangement that enables side by side (dual) Optical Image Stabilization (OIS) camera modules in portable devices, with minimal magnetic interaction between adjacent modules.

While other magnet arrangements described herein have four total magnets: one in each corner of the module or one along each side of the module, the embodiments described below and illustrated in FIGS. 12A-G include a single side magnet on one side and four total magnets on the adjacent sides, each pair with opposite polarity, which totals five magnets per module. The remaining single side (e.g., center between the two actuators) does not have a permanent magnet. In some embodiments, opposing polarity magnets function to contain the fringing flux field, which might otherwise be a a primary source of interaction forces between adjacent camera modules. Such embodiments reduce the interaction forces.

In some embodiments, each of FIGS. 12A-12G includes a view of a set of magnets (or a set of magnets and coils) usable for a dual camera unit, which unit is one embodiment of a first camera unit and a second camera unit of a multifunction device for capturing a first image of a first or second visual field. In some embodiments, magnets 1202a-g are lateral magnets of a first camera unit. In some embodiments, magnets 1204a-g are lateral magnets of a second camera unit. In some embodiments, the camera systems 1200a-g each include a first pair of first actuator transverse magnets 1206a-g and 1208a-g situated opposite one another with respect to an axis between lateral magnets 1202a-g and lateral magnets 1204a-g. In some embodiments, the camera systems 1200a-g further each comprise a second pair of first actuator transverse magnets 1210a-g and 1212a-g situated opposite one another with respect to an axis between lateral magnets 1202*a-g* and lateral magnets 1204*a-g*.

In some embodiments, the camera systems 1200*a-g* each further include a first pair of second actuator transverse magnets 1226*a-g* and 1228*a-g* situated opposite one another with respect to an axis between lateral magnets 1202*a-g* and lateral magnets 1204*a-g*. In some embodiments, the camera systems 1200*a-g* each further include a second pair of second actuator transverse magnets 1230*a-g* and 1232*a-g* situated opposite one another with respect to an axis between lateral magnets 1202*a-g* and lateral magnets 1204*a-g*. In some embodiments, magnets 1230*a-g*, 1226*a-g*, 1208*a-g*, and 1210*a-g* are oriented with a first polarity antiparallel to a second polarity with which magnets 1228*a-g*, 1226*a-g*, 1206*a-g* and 1212*a-g* are oriented.

In some embodiments, magnets 1206*a-g* and 1210*a-g* are arrayed in a pair with polarities opposite one another, and magnets 1232*a-g* and 1226*a-g* are arrayed in a pair with polarities opposite one another. In some embodiments, magnets 1206*a-g* and 1210*a-g* are arrayed in a pair with polarities opposite one another, and magnets 1232*a-g* and 1226*a-g* are arrayed in a pair with polarities opposite one another. In some embodiments, OIS coils 1240*a-g* interact with magnetic fields generated by respective ones of magnets 1202*a-g*-1232*a-g*. Some embodiments of orientations 1252*b-c*-1258*b-c* are provided in FIGS. 12B-C. In some embodiments, autofocus coils 1282*e*-1288*g* interact with magnetic fields generated by respective ones of magnets 1202*a-g*-1232*a-g*. Note that magnetic field orientations within any of FIGS. 12A-G may differ from magnetic field orientations of any other of FIGS. 12A-G, such that the use of "first orientation" or "second orientation" is arbitrary as between diagrams and represents many possible embodiments without departing from the scope or intent of the disclosure contained herein.

Figure 13A:
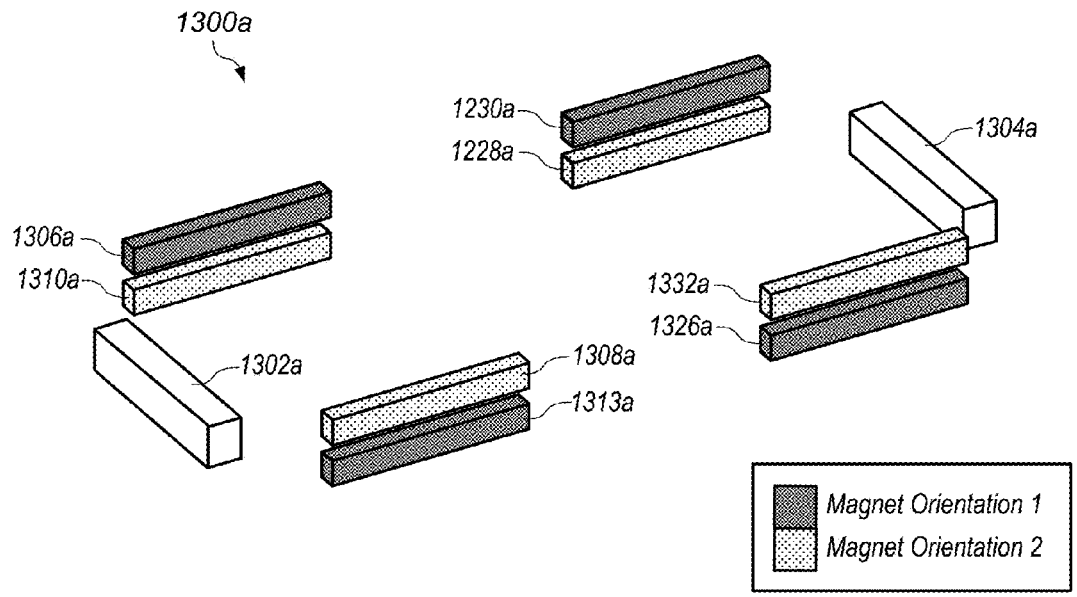
FIGS. 13A-B depict example embodiments of camera module components including arrays of magnets omitting a center magnet between modules and usable for a multiple camera system for portable zoom, according to at least some embodiments.
Figure 13B:
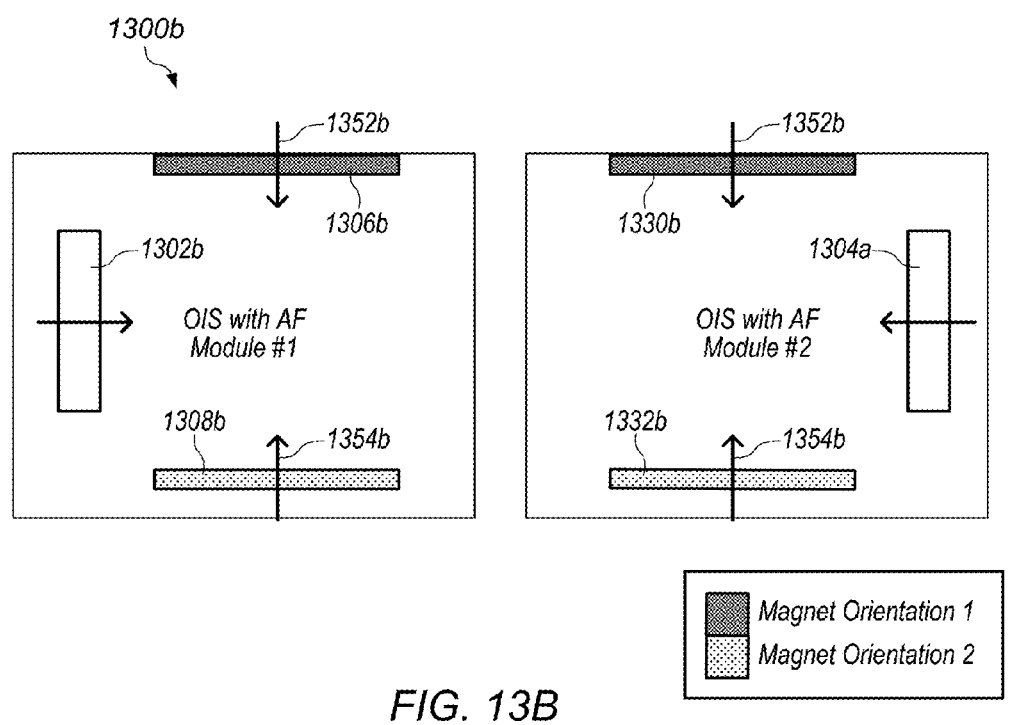

FIGS. 13A-B depict example embodiments of camera module components including arrays of magnets omitting a center magnet between modules and usable for a multiple camera system for portable zoom, according to at least some embodiments.

In some embodiments, each of FIGS. 13A-13B includes a view of a set of magnets usable for a dual camera unit, which unit is one embodiment of a first camera unit and a second camera unit of a multifunction device for capturing a first image of a first or second visual field. In some embodiments, magnets 1302*a-b* are lateral magnets of a first camera unit. In some embodiments, magnets 1304*a-b* are lateral magnets of a second camera unit. In some embodiments, the camera systems 1300*a-b* each include a first pair of first actuator transverse magnets 1306*a-b* and 1308*a-b* situated opposite one another with respect to an axis between lateral magnets 1302*a-b* and lateral magnets 1304*a-b*. In some embodiments, the camera systems 1300*a-b* further each comprise a second pair of first actuator transverse magnets 1310*a* and 1313*a* situated opposite one another with respect to an axis between lateral magnets 1302*a-b* and lateral magnets 1304*a-b*.

In some embodiments, the camera systems 1300*a-b* each further include a first pair of second actuator transverse magnets 1326*a* and 1328*a* situated opposite one another with respect to an axis between lateral magnets 1302*a-b* and lateral magnets 1304*a-b*. In some embodiments, the camera systems 1300*a-b* each further include a second pair of second actuator transverse magnets 1330*a-b* and 1332*a-b* situated opposite one another with respect to an axis between lateral magnets 1302*a-b* and lateral magnets 1304*a-b*. In some embodiments, magnets 1330*a-b*, 1326*a*, 1306*a-b*, and 1313*a* are oriented with a first polarity 1352*b* antiparallel to a second polarity 1354*b* with which magnets 1328*a*, 1332*a-b*, 1310*a* and 1308*a-b* are oriented.

In some embodiments, magnets 1306*a-b* and 1310*a* are arrayed in a pair with polarities opposite one another, and magnets 1332*a-b* and 1326*a* are arrayed in a pair with polarities opposite one another. In some embodiments, magnets 1306*a-b* and 1310*a* are arrayed in a pair with polarities opposite one another, and magnets 1332*a-b* and 1326*a* are arrayed in a pair with polarities opposite one another.

Figure 14A:
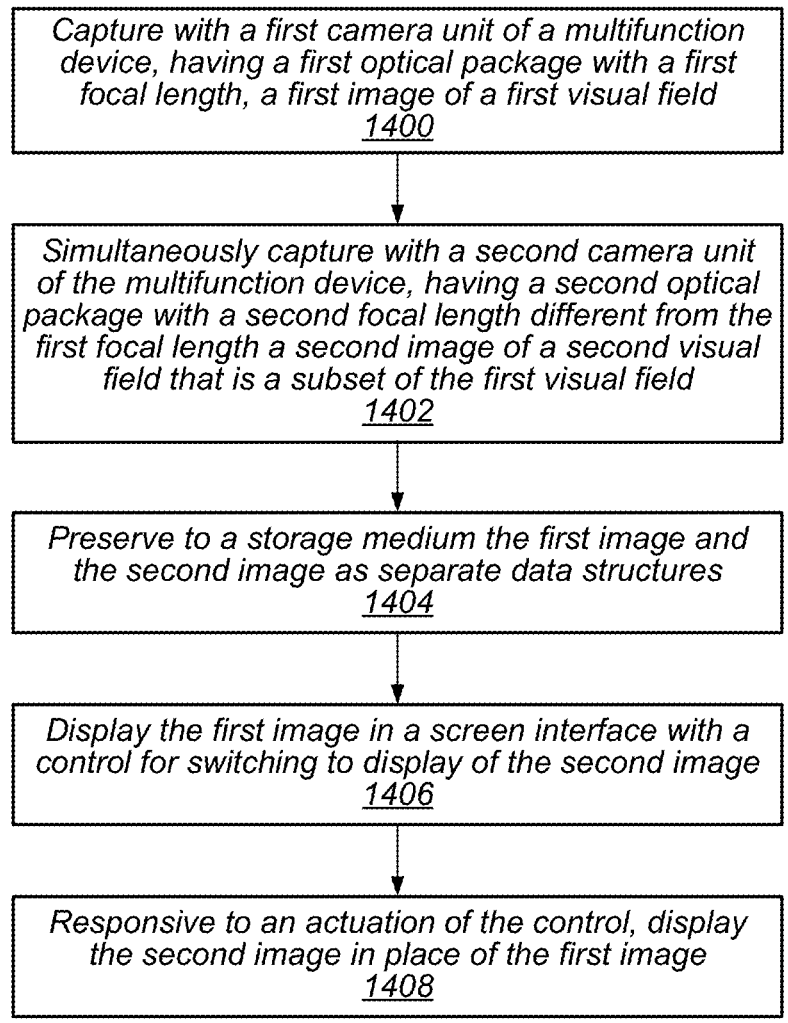
FIG. 14A is a flow chart of a method usable in a multiple camera system for portable zoom, according to at least some embodiments.

FIG. 14A is a flow chart of a method usable in a multiple camera system for portable zoom, according to at least some embodiments. A first camera unit of a multifunction device, having a first optical package with a first focal length, captures a first image of a first visual field (block 1400). A second camera unit of the multifunction device, having a second optical package with a second focal length different from the first focal length simultaneously captures a second image of a second visual field that is a subset of the first visual field (block 1402). The first image and the second image are preserved to a storage medium as separate data structures (block 1404). The first image is displayed in a screen interface with a control for switching to display of the second image (block 1406). Responsive to an actuation of the control, the second image is displayed in place of the first image (block 1408).

Figure 14B:
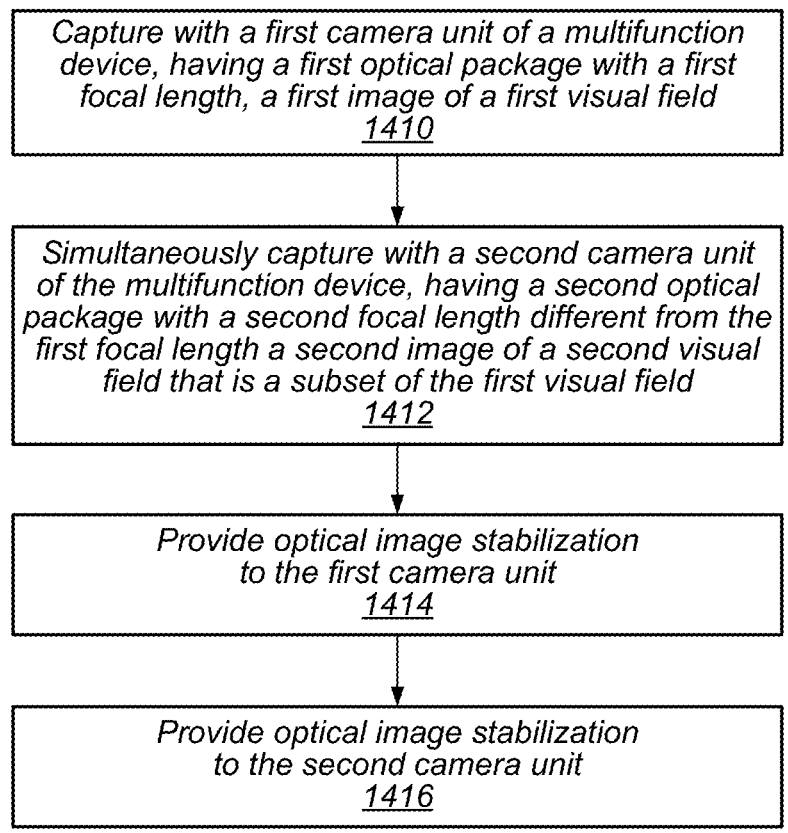
FIG. 14B is a flow chart of a method usable in a multiple camera system for portable zoom, according to at least some embodiments.

FIG. 14B is a flow chart of a method usable in a multiple camera system for portable zoom, according to at least some embodiments. A first camera unit of a multifunction device, having a first optical package with a first focal length, captures a first image of a first visual field (block 1410). A second camera unit of the multifunction device, having a second optical package with a second focal length different from the first focal length simultaneously captures a second image of a second visual field that is a subset of the first visual field (block 1412). Optical image stabilization is provided to the first camera unit (block 1414). Optical image stabilization is provided to the second camera unit (block 1414).

Example Computer System

Figure 15:
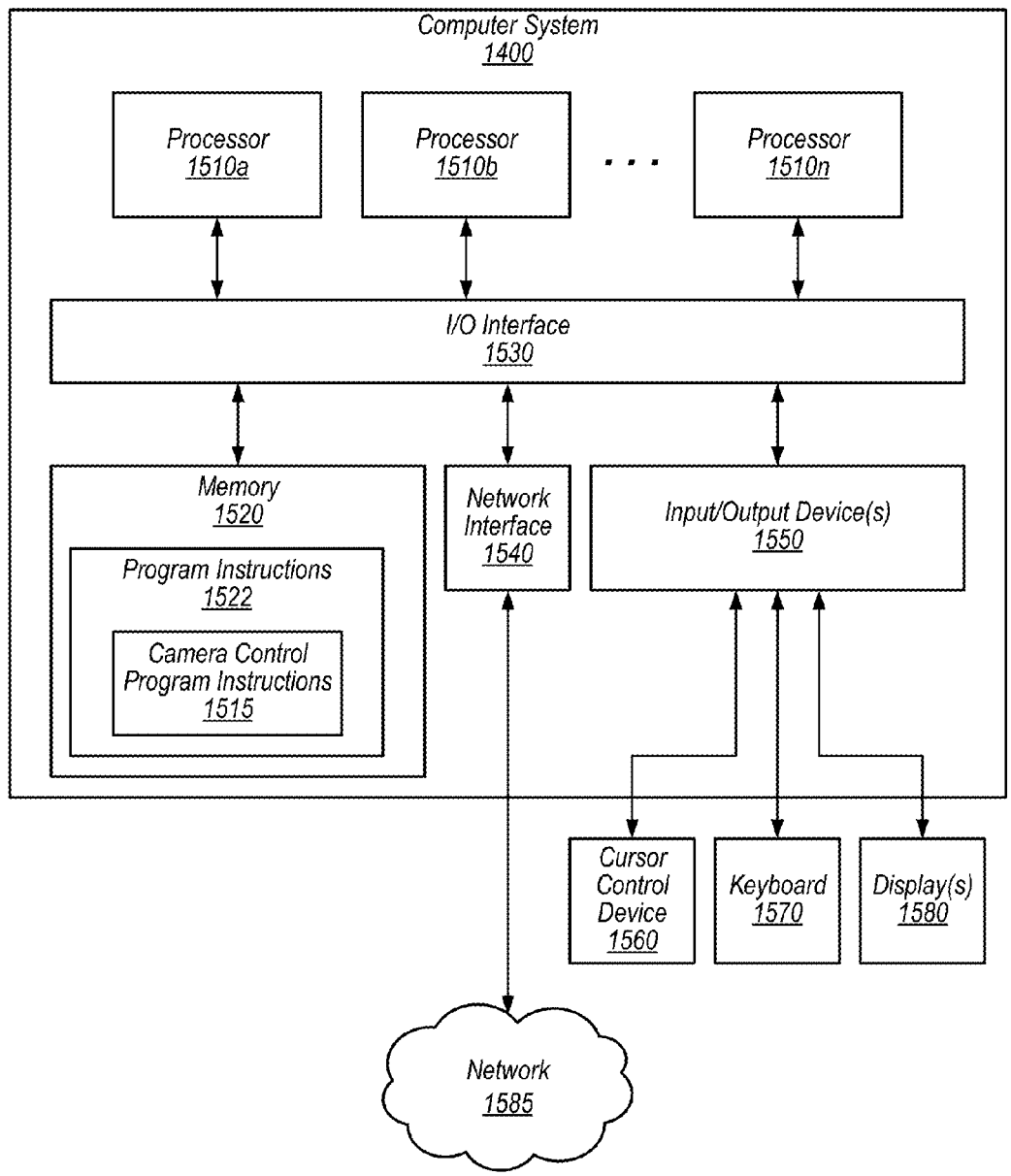
FIG. 15 illustrates an example computer system configured to implement aspects of the system and method for camera control, according to some embodiments.

FIG. 15 illustrates an example computer system 1500 that may be configured to execute any or all of the embodiments described above. In different embodiments, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a dual-prime camera system as described herein, including embodiments of single frame camera active optical tilt alignment correction, as described herein may be executed in one or more computer systems 1500, which may interact with various other devices. Note that any component, action, or functionality described above with respect to FIGS. 1-10 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store camera control program instructions 1522 and/or camera control data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement a lens control application 1524 incorporating any of the functionality described above. Additionally, existing camera control data 1532 of memory 1520 may include any of the information or data structures described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments:

CLAUSE 1: A camera system of a multifunction device, including:
  a first camera unit of a multifunction device for capturing a first image of a first visual field, wherein
    the first camera unit includes a first actuator for moving a first optical package configured for a first focal length; and
  a second camera unit of the multifunction device for simultaneously capturing a second image of a second visual field, wherein
    the second camera unit includes a second actuator for moving a second optical package configured for a second focal length
    the second actuator includes a second actuator lateral magnet;
  the first optical package and the second optical package are situated between the first actuator later magnet and the second actuator lateral magnet along an axis between the first actuator lateral magnet and the second actuator lateral magnet;
  no actuator lateral magnets are situated between the first optical package and the second optical package along the axis.

CLAUSE 2: The camera system of clause 1, wherein the first actuator lateral magnet and the second actuator lateral magnet have polarities aligned antiparallel to one another.

CLAUSE 3: The camera system of any of clauses 1-2, wherein
  the first camera unit and the second camera unit each include a respective first pair of first actuator transverse magnets situated opposite one another with respect to the axis between the first actuator lateral magnet and the second actuator lateral magnet; and
  the first camera unit and the second camera unit each include a respective second pair of first actuator transverse magnets situated opposite one another with respect to the axis between the first actuator lateral magnet and the second actuator lateral magnet.

CLAUSE 4: The camera system of clause 3, wherein
  the magnets of the respective first pair of first actuator transverse magnets have polarity alignments parallel to the respective alignments of corresponding respective magnets of the first pair of second actuator transverse magnets.

CLAUSE 5: The camera system of clause 3, wherein
  the magnets of the respective first pair of first actuator transverse magnets have polarity alignments antiparallel to the respective alignments of corresponding respective magnets of the first pair of second actuator transverse magnets.

CLAUSE 6: The camera system of clause 5, wherein
  the first actuator lateral magnet and the second actuator lateral magnet have polarities aligned at right angles to polarities of the respective first pair of first actuator transverse magnets.

CLAUSE 7: The camera system of any of clauses 1-6, further including
  coils aligned with current circulating in a plane parallel to a plane in which the first actuator lateral magnet and the second actuator lateral magnet have polarities aligned.

CLAUSE 8: A camera unit of a multifunction device, including:
  an optical package;
  an actuator for moving the optical package to a first focal length, wherein the actuator includes
    a lateral magnet to one side of the optical package,
    a first pair of first actuator transverse magnets situated on sides opposite one another with respect to an axis between the optical package and the lateral magnet, wherein
      the lateral magnet is situated one on one side of the optical package at which no transverse magnets are present; and
  wherein no actuator lateral magnet is situated on a remaining side of the optical package at which nether the lateral magnet nor the transverse magnets are situated.

CLAUSE 9: The camera unit of clause 8, further including:
  coils aligned with current circulating in a plane parallel to a plane in which the lateral magnet and the transverse magnets have polarities aligned.

CLAUSE 10: The camera unit of any of clauses 8-9, further including:
  coils aligned with current circulating in a plane perpendicular to a plane in which the lateral magnet and the transverse magnets have polarities aligned.

CLAUSE 11: The camera unit of any of clauses 8-10, further including:
  a second pair of first actuator transverse magnets situated opposite one another with respect to the axis between the lateral magnet and the optical package.

CLAUSE 12: The camera unit of clause 11, further including:
  the magnets of the first pair of transverse magnets have polarity alignments antiparallel to one another.

CLAUSE 13: The camera unit of clause 11, further including:
  the magnets of the second pair of transverse magnets have polarity alignments antiparallel to one another.

CLAUSE 14: The camera unit of clause 11, further including:
  the magnets of the first pair of transverse magnets have polarity alignments antiparallel to magnets of the second pair of transverse magnets situated on a same side of the axis between the lateral magnet and the optical package.

CLAUSE 15: An actuator, including:
- a lateral magnet for moving an optical package, wherein the lateral magnet is situated to one side of the optical package,
- a first pair of first actuator transverse magnets situated on sides opposite one another with respect to an axis between the optical package and the lateral magnet, wherein
  - the lateral magnet is situated one on one side of the optical package at which no transverse magnets are present; and
- wherein no actuator lateral magnet is situated on a remaining side of the optical package at which nether the lateral magnet nor the transverse magnets are situated.

CLAUSE 16: The actuator of clause 15, further including:
- coils aligned with current circulating in a plane parallel to a plane in which the lateral magnet and the transverse magnets have polarities aligned.

CLAUSE 17: The actuator of any of clauses 15-16, further including:
- coils aligned with current circulating in a plane perpendicular to a plane in which the lateral magnet and the transverse magnets have polarities aligned.

CLAUSE 18: The actuator of any of clauses 15-17, further including:
- a second pair of first actuator transverse magnets situated opposite one another with respect to the axis between the lateral magnet and the optical package.

CLAUSE 19: The actuator of clause 18, wherein:
- the magnets of the first pair of transverse magnets have polarity alignments antiparallel to one another.

CLAUSE 20: The actuator of clause 18, wherein:
- the magnets of the second pair of transverse magnets have polarity alignments antiparallel to one another.

CLAUSE 21: A camera system of a multifunction device, including:
- a first camera unit of a multifunction device for capturing a first image of a first visual field, wherein
  - the first camera unit includes a first optical image stabilization actuator for moving a first optical package configured for a first focal length; and
- a second camera unit of the multifunction device for simultaneously capturing a second image of a second visual field, wherein
  - the second camera unit includes a second optical image stabilization actuator for moving a second optical package configured for a second focal length, and
  - the first focal length is different from the second focal length.

CLAUSE 22: The camera system of clause 21, wherein:
- the camera system includes a shared magnet positioned between the first camera unit and the second camera unit to generate magnetic fields usable in creating motion in both the first camera actuator and the second camera actuator.

CLAUSE 23: The camera system of any of clauses 21-22, wherein:
- the camera system includes a shared magnet positioned between the first camera unit and the second camera unit to generate magnetic fields usable in creating motion in both the first camera actuator and the second camera actuator;
- the camera system further includes a first actuator lateral magnet positioned opposite the shared magnet with respect to an optical axis of the first camera unit;
- the camera system further includes a pair of first actuator transverse magnets situated opposite one another with respect to an axis between the shared magnet and the first actuator lateral magnet;
- the camera system further includes a second actuator lateral magnet positioned opposite the shared magnet with respect to an optical axis of the second camera unit; and
- the camera system further includes a pair of second actuator transverse magnets situated opposite one another with respect to an axis between the shared magnet and the second actuator lateral magnet.

CLAUSE 24: The camera system of any of clauses 21-23, wherein:
- the camera system includes a shared magnet holder to which are attached one or more magnets of the first camera unit and one or more magnets of the second camera unit used to generate magnetic fields usable in creating motion in one or more of the first camera actuator and the second camera actuator.

CLAUSE 25: The camera system of any of clauses 21-24, wherein:
- the camera system includes one or more stationary magnets secured at fixed positions relative to image sensors of the first camera unit and the second camera unit to generate magnetic fields usable in creating motion in one or more of the first camera actuator and the second camera actuator.

CLAUSE 26: The camera system of any of clauses 21-25, wherein:
- the second camera unit includes a second central magnet array situated along the axis between the first optics package of the first camera unit and the second optics package of the second camera unit;
- the second central magnet array includes an second central upper magnet having a first polarity and a second central lower magnet having a polarity antiparallel to the first polarity;
- the second camera unit includes a second distal magnet array situated opposite the second central magnet array with respect to the second optics package of the second camera unit; and
- the second distal magnet array includes a second distal lower magnet having the first polarity and a second distal upper magnet having the polarity antiparallel to the first polarity.

CLAUSE 27: The camera system of clause 26, wherein:
- the first camera unit includes a first central magnet array situated along an axis between a first optics package of the first camera unit and a second optics package of the second camera unit;
- the first central magnet array includes a first central upper magnet having a first polarity and a first central lower magnet having a polarity antiparallel to the first polarity;
- the first camera unit includes a first distal magnet array situated opposite the first central magnet array with respect to the first optics package of the first camera unit; and
- the first distal magnet array includes a first distal lower magnet having the first polarity and a first distal upper magnet having the polarity antiparallel to the first polarity.

CLAUSE 28: The camera system of any of clauses 21-27, further including:
- a magnetic shield between the first optical image stabilization actuator and the second optical image stabilization actuator.

CLAUSE 29: The camera system of any of clauses 21-28, further including:
- a metallic shield between the first optical image stabilization actuator and the second optical image stabilization actuator, wherein
  - the metallic shield includes steel including at least a quantity of iron, a quantity of manganese, a quantity of Sulphur, a quantity of phosphorus, and a quantity of carbon.

CLAUSE 30: A method, including:
- a first camera unit of a multifunction device capturing a first image of a first visual field;
- a second camera unit of the multifunction device simultaneously capturing a second image of a second visual field, wherein
  - the first camera unit includes a first optical package with a first focal length,
  - the second camera unit includes a second optical package with a second focal length,
  - the first focal length is different from the second focal length, and
  - the first visual field is a subset of the second visual field;
- providing optical image stabilization to the first camera unit; and
- providing optical image stabilization to the second camera unit.

CLAUSE 31: The method of clause 30, wherein:
- the providing optical image stabilization to the first camera unit and the providing optical image stabilization to the second camera unit further include moving the first camera unit and the second camera unit independently of one another.

CLAUSE 32: The method of any of clauses 30-31, wherein:
- the providing optical image stabilization to the first camera unit and the providing optical image stabilization to the second camera unit further include moving the first camera unit and the second camera unit in unison.

CLAUSE 33: The method of any of clauses 30-32, wherein:
- the providing optical image stabilization to the first camera unit and the providing optical image stabilization to the second camera unit further include generating a first magnetic field in the first camera unit and a second magnetic field in the second camera unit based on a magnet shared between the first camera unit and the second camera unit.

CLAUSE 34: The method of any of clauses 30-33, wherein:
- the providing optical image stabilization to the first camera unit and the providing optical image stabilization to the second camera unit further include moving the first camera unit and the second camera unit in unison through operation of a first camera unit actuator and a second camera unit actuator that share a central magnet.

CLAUSE 35: The method of any of clauses 30-34, wherein:
- the providing optical image stabilization to the first camera unit and the providing optical image stabilization to the second camera unit further include moving the first camera unit and the second camera unit in unison through operation of a first camera unit actuator and a second camera unit actuator that share a magnet holder.

CLAUSE 36: A non-transitory computer-readable storage medium, storing program instructions, wherein the program instructions are computer-executable to implement:
- capturing a first image of a first visual field with a first camera unit of a multifunction device;
- simultaneously capturing a second image of a second visual field with a second camera unit of the multifunction device, wherein
  - the first camera unit includes a first optical package with a first focal length,
  - the second camera unit includes a second optical package with a second focal length,
  - the first focal length is different from the second focal length, and
  - the first visual field is a subset of the second visual field;
- providing optical image stabilization to the first camera unit; and
- providing optical image stabilization to the second camera unit.

CLAUSE 37: The non-transitory computer-readable storage medium of clause 36, wherein:
- the program instructions computer-executable to implement providing optical image stabilization to the first camera unit and the providing optical image stabilization to the second camera unit further include program instructions computer-executable to implement moving the first camera unit and the second camera unit independently of one another.

CLAUSE 38: The non-transitory computer-readable storage medium of any of clauses 36-37, wherein:
- the program instructions computer-executable to implement providing optical image stabilization to the first camera unit and the providing optical image stabilization to the second camera unit further include program instructions computer-executable to implement moving the first camera unit and the second camera unit in unison.

CLAUSE 39: The non-transitory computer-readable storage medium of any of clauses 36-38, wherein
- the program instructions computer-executable to implement providing optical image stabilization to the first camera unit and the program instructions computer-executable to implement providing optical image stabilization to the second camera unit further include program instructions computer-executable to implement generating a first magnetic field in the first camera unit and a second magnetic field in the second camera unit based on a magnet shared between the first camera unit and the second camera unit.

CLAUSE 40: The non-transitory computer-readable storage medium of any of clauses 36-39, wherein:
- the program instructions computer-executable to implement providing optical image stabilization to the first camera unit and the program instructions computer-executable to implement providing optical image stabilization to the second camera unit further include program instructions computer-executable to implement moving the first camera unit and the second camera unit in unison through operation of a first camera unit actuator and a second camera unit actuator that share a magnet holder.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera system of a multifunction device, comprising:
a first camera unit of the multifunction device, the first camera unit for capturing a first image of a first visual field, wherein:
the first camera unit comprises a first actuator for moving a first optical package configured for a first focal length, and
the first actuator comprises:
a first actuator lateral magnet to move the first optical package in one or more directions orthogonal to a first optical axis of the first optical package; and
a first pair of actuator transverse magnets to move the first optical package along at least the first optical axis, the first pair of actuator transverse magnets situated on opposite sides of one another with respect to the first optical package; and
a second camera unit of the multifunction device, the second camera unit for capturing a second image of a second visual field, wherein:
the second camera unit comprises a second actuator for moving a second optical package configured for a second focal length, and
the second actuator comprises a second actuator lateral magnet to move the second optical package in one or more directions orthogonal to a second optical axis of the second optical package;
wherein:
the first optical package and the second optical package are situated between the first actuator lateral magnet and the second actuator lateral magnet along an axis between the first actuator lateral magnet and the second actuator lateral magnet; and
no actuator lateral magnets are situated between the first optical package and the second optical package along the axis.

2. The camera system of claim 1, wherein the first actuator lateral magnet and the second actuator lateral magnet have polarities aligned antiparallel to one another.

3. The camera system of claim 1, wherein:
the first actuator and the second actuator each comprise a respective first pair of first actuator transverse magnets situated opposite one another with respect to the axis between the first actuator lateral magnet and the second actuator lateral magnet; and
the first actuator and the second actuator each comprise a respective second pair of first actuator transverse magnets situated opposite one another with respect to the axis between the first actuator lateral magnet and the second actuator lateral magnet.

4. The camera system of claim 3, wherein:
the magnets of the respective first pair of first actuator transverse magnets have polarity alignments parallel to the respective alignments of corresponding respective magnets of the first pair of second actuator transverse magnets.

5. The camera system of claim 3, wherein:
the magnets of the respective first pair of first actuator transverse magnets have polarity alignments antiparallel to the respective alignments of corresponding respective magnets of the first pair of second actuator transverse magnets.

6. The camera system of claim 5, wherein:
the first actuator lateral magnet and the second actuator lateral magnet have polarities aligned at right angles to polarities of the respective first pair of first actuator transverse magnets.

7. The camera system of claim 1, further comprising:
coils aligned with current circulating in a plane parallel to a plane in which the first actuator lateral magnet and the second actuator lateral magnet have polarities aligned.

8. A camera unit of a multifunction device, comprising:
an optical package;
an actuator for moving the optical package to a first focal length, wherein the actuator comprises:
an actuator lateral magnet to move the optical package in one or more directions orthogonal to an optical axis of the optical package, and
a first pair of actuator transverse magnets to move the optical package along at least the optical axis, the first pair of actuator transverse magnets situated on sides opposite one another with respect to an axis between the optical package and the actuator lateral magnet;
wherein:
the actuator lateral magnet is situated to one side of the optical package at which no actuator transverse magnets are present; and
the actuator does not include an actuator magnet opposite the actuator lateral magnet with respect to the optical package.

9. The camera unit of claim 8, further comprising:
coils aligned with current circulating in a plane parallel to a plane in which the actuator lateral magnet and the actuator transverse magnets have polarities aligned.

10. The camera unit of claim 8, further comprising:
coils aligned with current circulating in a plane perpendicular to a plane in which the actuator lateral magnet and the actuator transverse magnets have polarities aligned.

11. The camera unit of claim 8, further comprising:
a second pair of actuator transverse magnets situated opposite one another with respect to the axis between the actuator lateral magnet and the optical package.

12. The camera unit of claim 11, wherein:
the magnets of the first pair of actuator transverse magnets have polarity alignments antiparallel to one another.

13. The camera unit of claim 11, wherein:
the magnets of the second pair of actuator transverse magnets have polarity alignments antiparallel to one another.

14. The camera unit of claim 11, wherein:
the magnets of the first pair of actuator transverse magnets have polarity alignments antiparallel to magnets of the second pair of actuator transverse magnets situated on a same side of the axis between the actuator lateral magnet and the optical package.

15. An actuator, comprising:
an actuator lateral magnet that moves an optical package in at least a first direction that is orthogonal to an optical axis of the optical package, and
a first pair of actuator transverse magnets that move the optical package in at least a second direction that is orthogonal to the first direction, the first pair of actuator transverse magnets situated on sides opposite one another with respect to an axis between the optical package and the actuator lateral magnet;

wherein:
  the actuator lateral magnet is situated one on one side of the optical package at which no transverse magnets are present; and
  the actuator does not include an actuator magnet opposite the actuator lateral magnet with respect to the optical package.

16. The actuator of claim 15, further comprising:
coils aligned with current circulating in a plane parallel to a plane in which the actuator lateral magnet and the actuator transverse magnets have polarities aligned.

17. The actuator of claim 15, further comprising:
coils aligned with current circulating in a plane perpendicular to a plane in which the actuator lateral magnet and the actuator transverse magnets have polarities aligned.

18. The actuator of claim 15, further comprising:
a second pair of actuator transverse magnets situated opposite one another with respect to the axis between the actuator lateral magnet and the optical package.

19. The actuator of claim 18, wherein:
the magnets of the first pair of actuator transverse magnets have polarity alignments antiparallel to one another.

20. The actuator of claim 18, wherein:
the magnets of the second pair of actuator transverse magnets have polarity alignments antiparallel to one another.

* * * * *